Oct. 1, 1963 G. B. GREENE 3,105,636
COMPUTING AND RECORDING APPARATUS
Filed Dec. 24, 1958 10 Sheets-Sheet 1

INVENTOR.
GEORGE B. GREENE
BY
Lippincott, Ralph & Henderson
ATTORNEYS

Oct. 1, 1963 G. B. GREENE 3,105,636
COMPUTING AND RECORDING APPARATUS
Filed Dec. 24, 1958 10 Sheets-Sheet 2

INVENTOR.
GEORGE B. GREENE
BY
Lippincott, Ralk & Hendrickson
ATTORNEYS

Oct. 1, 1963  G. B. GREENE  3,105,636
COMPUTING AND RECORDING APPARATUS
Filed Dec. 24, 1958  10 Sheets-Sheet 3

INVENTOR.
GEORGE B. GREENE
BY
Lippincott, Ralk & Henderson
ATTORNEYS

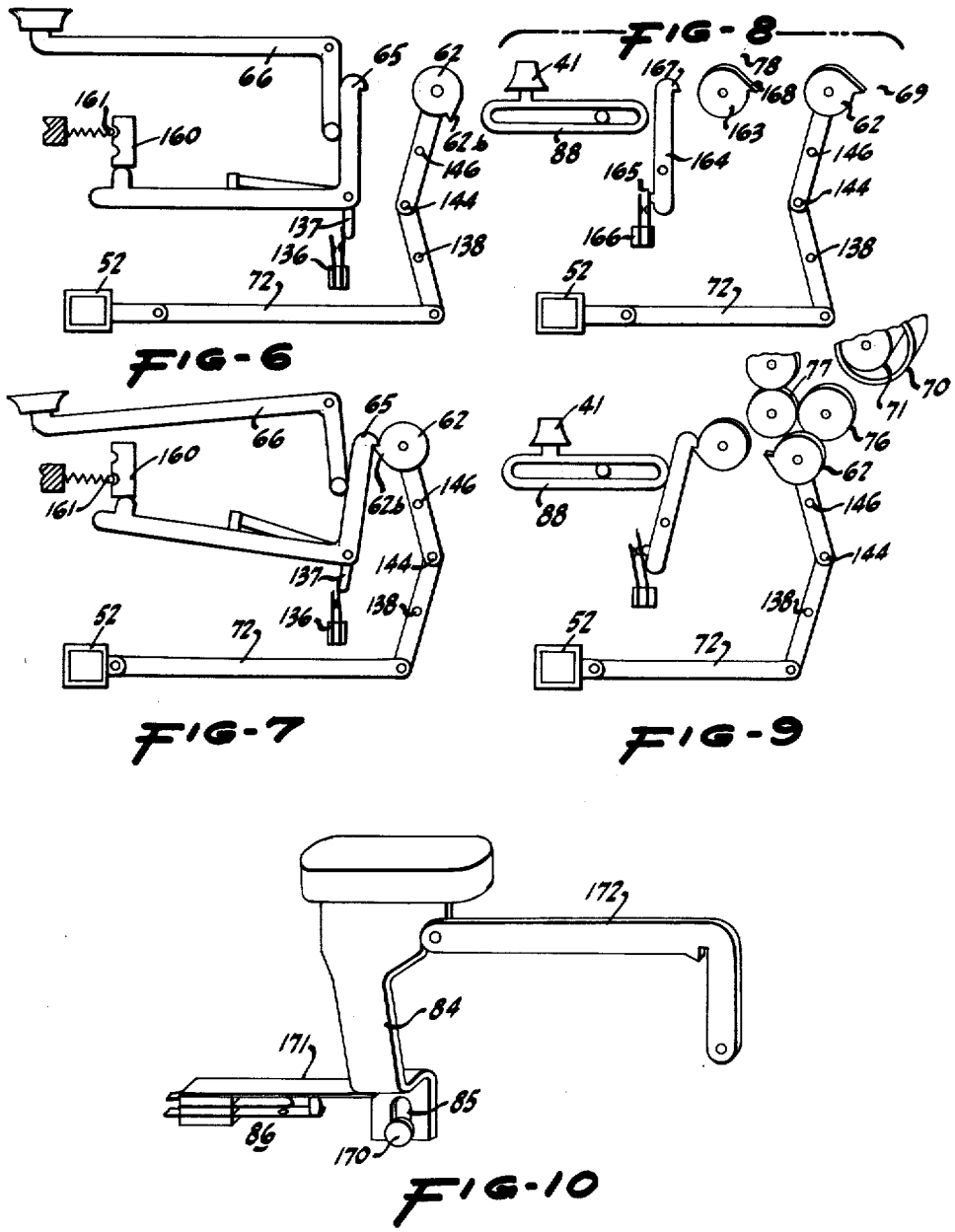

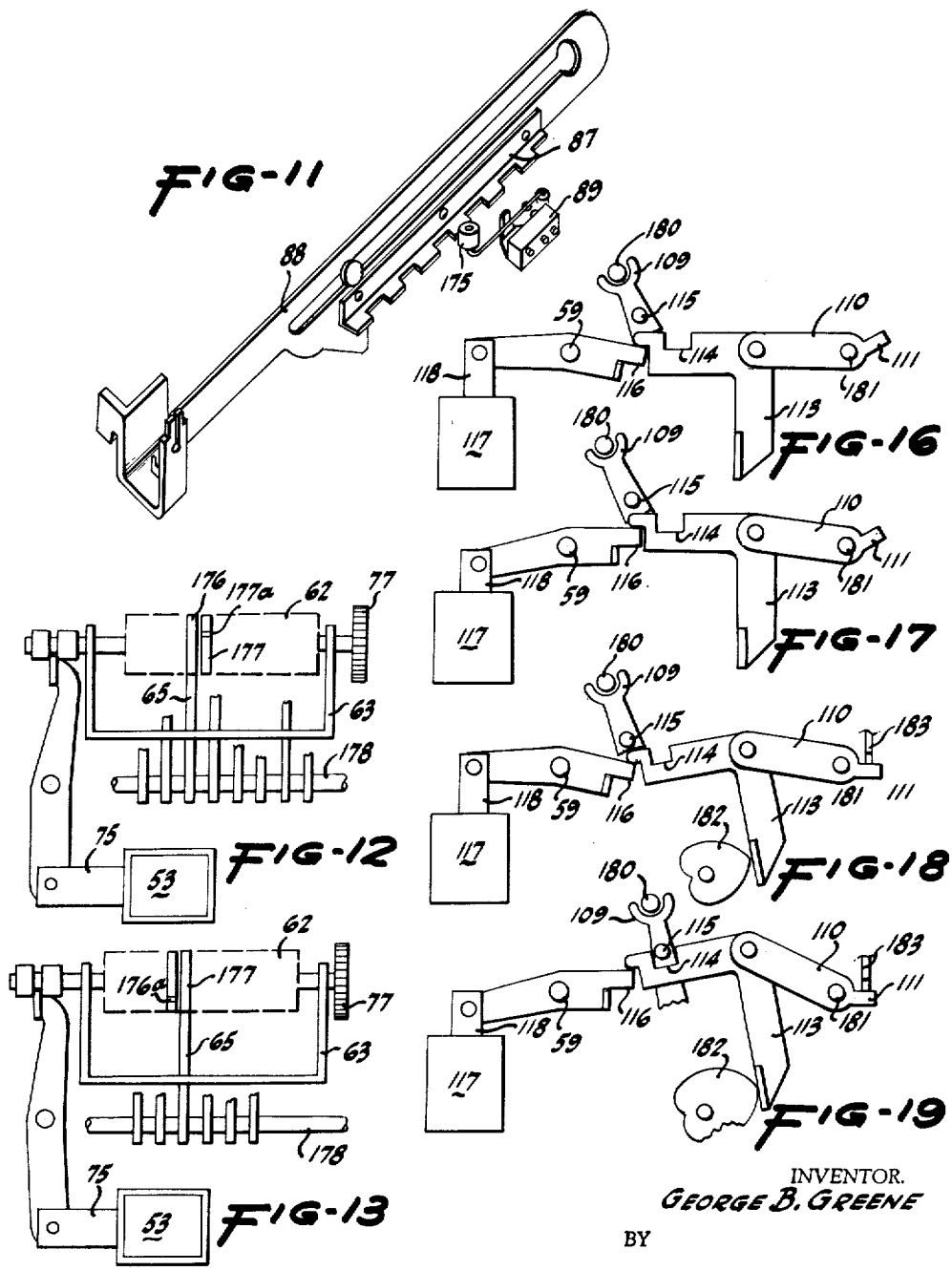

Oct. 1, 1963 G. B. GREENE 3,105,636
COMPOUND RECORDING APPARATUS
Filed Dec. 24, 1958 10 Sheets-Sheet 7

INVENTOR.
GEORGE B. GREENE
BY
Lippincott, Ralbe & Hendrickson
ATTORNEYS

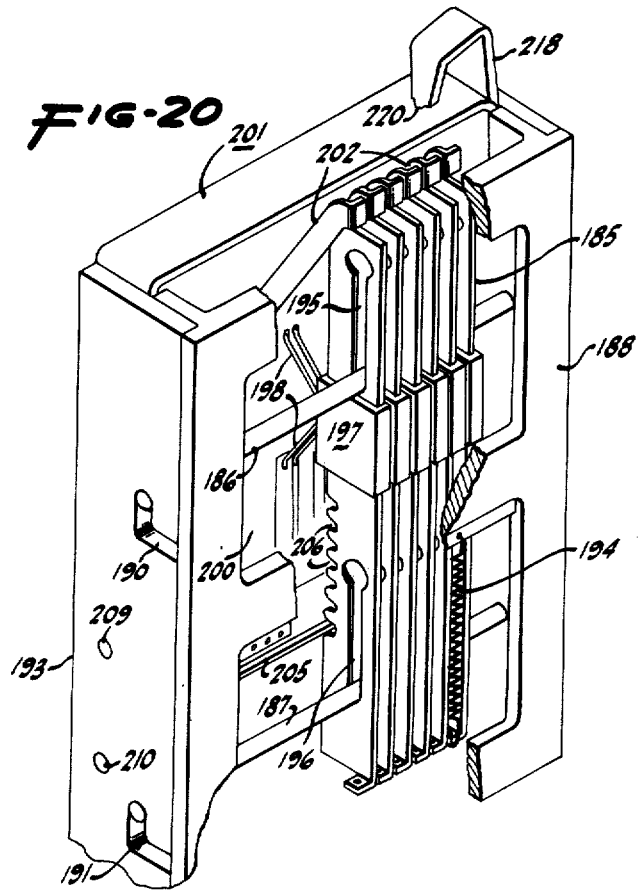
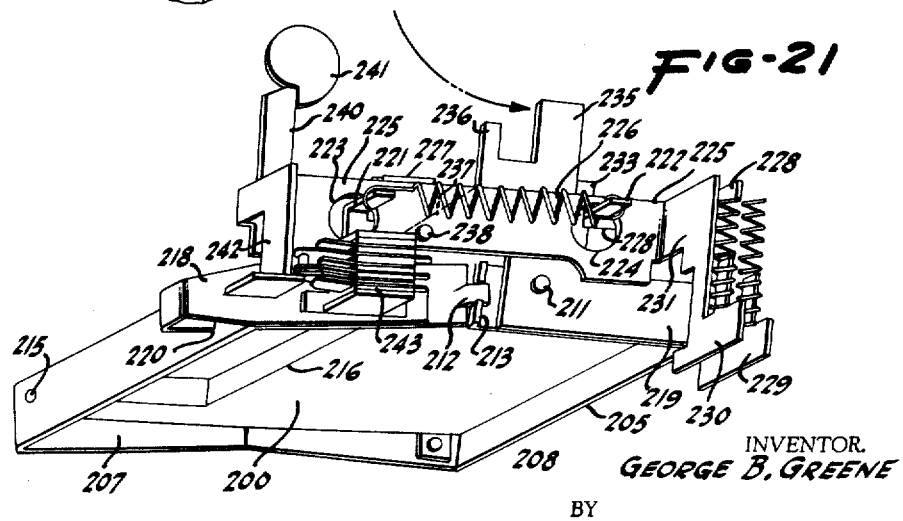

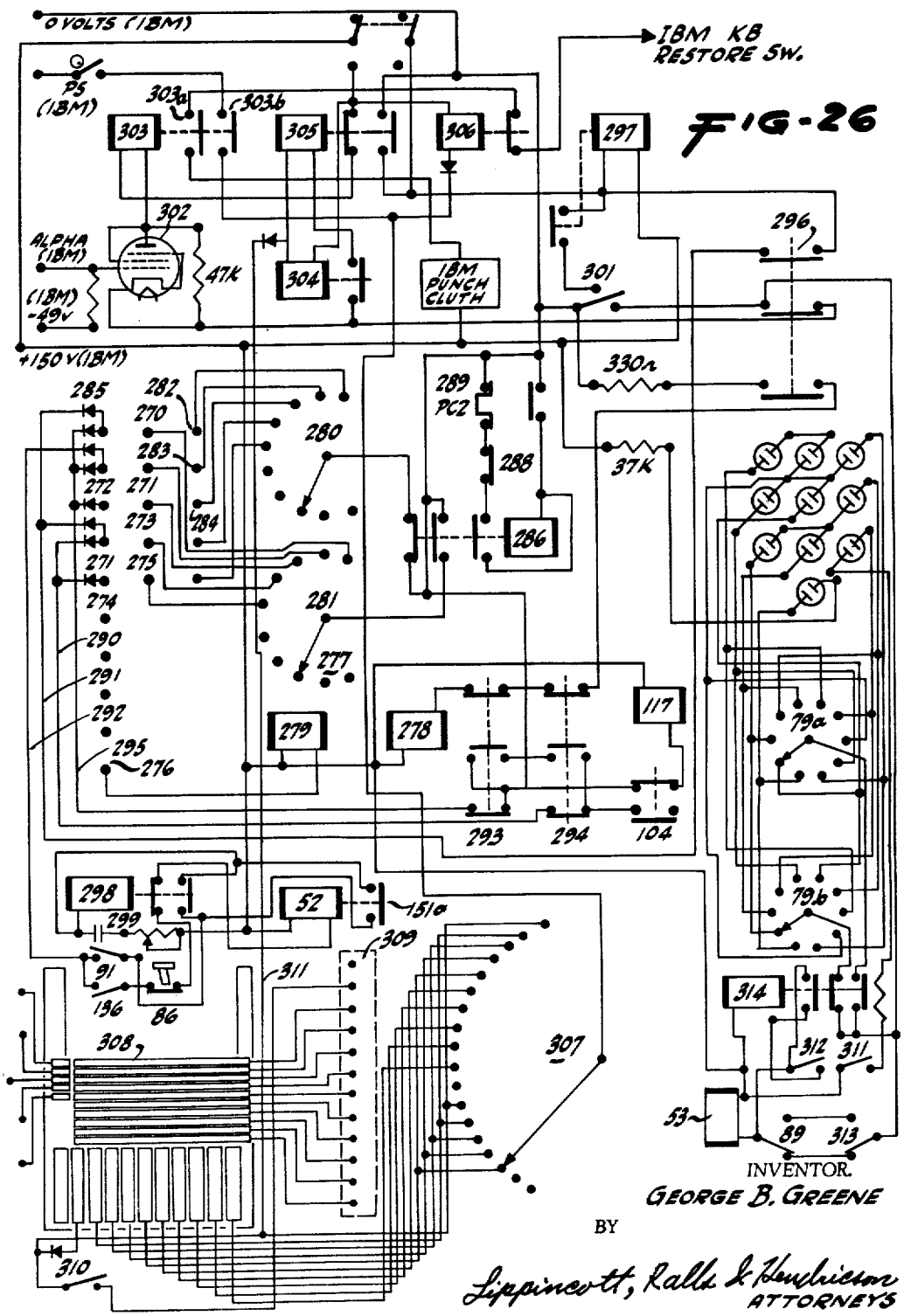

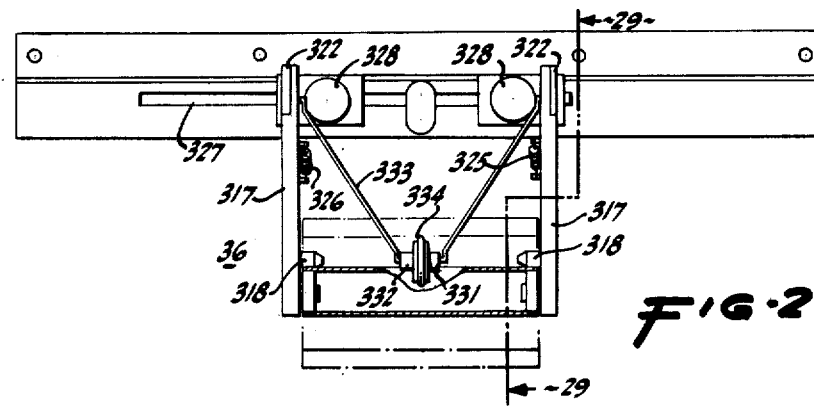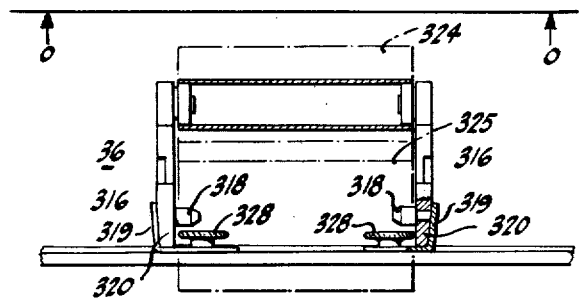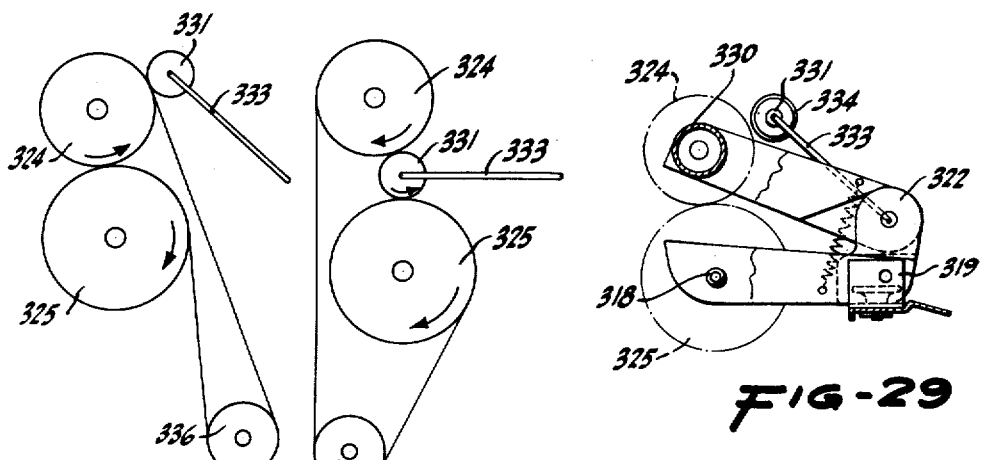

United States Patent Office 3,105,636
Patented Oct. 1, 1963

3,105,636
COMPUTING AND RECORDING APPARATUS
George B. Greene, Boulder, Colo.
(440 Buena Vista Drive, Pinole, Calif.)
Filed Dec. 24, 1958, Ser. No. 782,911
17 Claims. (Cl. 235—60.25)

This invention relates to business machines and particularly to computers and recording devices of the card or tape punching type and mechanism for coupling such machines for coordinated operation.

Various arrangements have been proposed for using a computer such as an adding machine as an input device for a key punch machine. A satisfactory combination of these machines results in substantial economies in modern accounting operations. Much of the advantage may be lost if there is a substantial likelihood that the operator can punch incorrect or erroneous account numbers, and various arrangements have been provided for verifying or comparing the numbers before the cards or tape are released for use. Modern credit card systems such as employed by the oil companies for retail sales employ the so-called self-check account numbers in order to prove the accounts by their numbers and avoid erroneous charges. Obviously it is desirable in such systems to avoid the punching of cards or tape until the account number has been proved. This is especially true in the case of punched cards such as those used by the oil companies for credit card accounts and in which punch card sales slips are employed. Then the customer is required to sign a card which becomes the original sales record which is punched later during the accounting operations; erroneous punching of such cards thus mutilates an original record.

Accordingly, it is an object of the present invention to provide an account computer for operation in conjunction with a recording equipment and which includes a checking device for assuring accuracy of transcription of the codes or account numbers before permitting their transmission for recording.

It is another object of this invention to provide an improved device for checking the validity of self-check codes or account numbers.

It is another object of this invention to provide an improved digit storing or memory device for computing machines of the key-actuated type.

It is a further object of this invention to provide an improved program control apparatus for computing and recording systems.

It is a still further object of this invention to provide a computing machine having a tape printing mechanism and including an improved line feed device for controlling the printing operation.

It is still another object of this invention to provide a computing machine having a tape printing mechanism and including an improved device for mounting the tape supply and for collecting the printed tape.

Further objects and advantages of the invention will become apparent as the following description proceeds and the features of novelty which characterize the invention will be pointed out with particularity in the claims annexed to and forming a part of this specification.

Briefly, in carrying out the objects of this invention in one embodiment thereof a key punch machine and a ten-key adding machine are interconnected by an electrical system which makes it possible to transfer to the key punch the digital information set up in the adding machine by the operation of the ten keys. A checking mechanism is provided which makes it possible to determine whether or not a code or account number of the self-checking type has been correctly keyed into the adding machine. The self-checking device includes a locking mechanism which prevents operation of the adding machine by actuation of the motor by a key unless the summation of the digital information noted on the keyboard is correct in accordance with the code. By way of example, one code commonly employed comprises a series of digits alternate ones of which are weighted so that the sum of the weighted and unweighted digits will total properly only when set up in the proper order. Then, a self-check code digit for that particular customer account number is introduced so that the total will equal a predetermined number, for example any multiple of ten. The checking device is actuated in response to the depression of the keys to provide a summation of the digital information entered on the keys suggested in accordance with the applicable code and upon a condition depending upon the agreement of the summation of information with the requirements of the code, e.g. when the sum of weighted and unweighted digits plus the self-check digit equals a multiple of ten, the checking device actuates a mechanism to release or free the motor bar of the adding machine for operation on items to be added and so that the coded number can be transmitted for recording. The adding machine employed is preferably of the type having a printed tape for recording the entries and which includes a memory device such as a pin box for retaining the information resulting from the depression of the keys. When the information is released by the checking device the entry may be printed by operation of the motor bar. In addition to the pin box or other memory device of the adding machine, a second memory device is provided which is set up upon actuation of the motor bar and provides electrical contacts prepared in accordance with the entry on the pin box. These electrical contacts are arranged to be connected to the circuit of the key punch machine and when the key punch is conditioned for receiving entries the digital information is transferred from the second memory device to the punch machine for punching of cards or tape in the usual manner. The arrangement makes it possible to have two entries, one on the pin box and one on the second memory device, ready for transmission as soon as the key punch is in condition to receive the information, the entries being transmitted successively upon conditioning of the key punch.

Further controls of the programming device are provided so that the several functions of the adding machine and key punch may be coordinated with a particular accounting program. For example, the calculating operation of the adding machine may be omitted when account numbers or similar identifying information is being transmitted from the key entry to the printed tape or to the key punch. Either of two tabular columns of the printed tape may be selected, the punching operation of the key punch may be omitted, the checking operation may be omitted, either of two alternate programs may be selected, and desirable combinations of the several control functions may be selected.

Pilot lights are provided to indicate to the operator the condition of the automatic self-check device and an arrangement has been provided so that, in the event one of the digits of a self-checking code does not appear legibly upon the original record, the operator may secure an indication on the lights of the value of the missing digit required to complete the self-checking code. Thus by operation of the machine of this invention an operator may secure information which otherwise would require reference to the account files. This light arrangement also makes it possible for the operator to add to any entry a self-checking digit so that the entry may be employed thereafter as a self-checking number. The invention also provides an improved arrangement for servicing the tape supply for the printing mechanism of the adding machine and for collecting the printed tape.

For a better understanding of the invention, reference may be had to the accompanying drawings, in which:

FIGS. 6, 7, 8 and 9 are diagrammatic views illustrating certain steps in the operation of the self-checking mechanism;

FIG. 10 is an enlarged detail view of the zero key and its associated control;

FIG. 11 is an enlarged detail view of a portion of the checking device;

FIGS. 12 and 13 are diagrammatic views illustrating the operation of a shifting device in the checking mechanism;

FIGS. 16, 17, 18 and 19 are diagrammatic views illustrating the operation of the line feed control of the adding machine carriage and printer;

FIGS. 20 and 21 are enlarged detail perspective views of an information storage and commutating and read-out control device mounted on the bottom of the adding machine;

FIG. 26 is a schematic diagram of the system of the invention;

FIG. 27 is a plan view of the printing tape supply and feed of the machine;

FIG. 28 is a rear elevation view of the device of FIG. 27;

FIG. 29 is a side elevation view partly in section along the line 29—29 of FIG. 27; and FIGS. 30 and 31 are diagrammatic views illustrating the operation of the device of FIG. 27.

Figure 1:
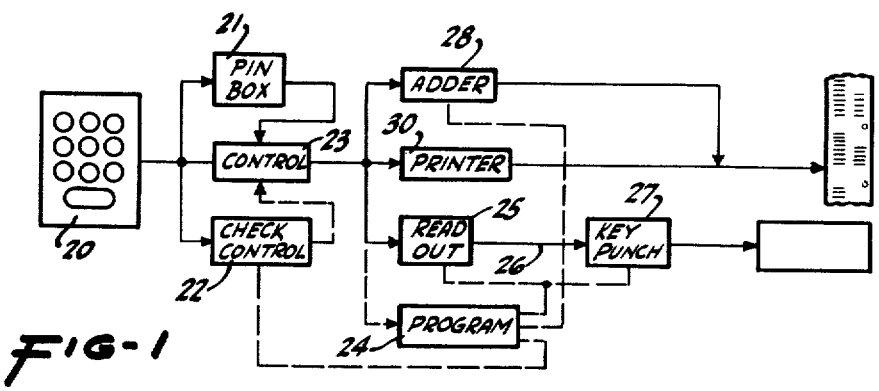
FIG. 1 is a block diagram of a system embodying the invention.

The block diagram, FIG. 1, illustrates the relationship of the principal functional elements of the system. The ten-key board of the adding machine is indicated at 20. Actuation of the keys of the board 20 operates the mechanism of the adding machine to set pins in a pin box or memory device 21 corresponding to the keys of the board 20 which have been depressed and also to supply the same information to a check control 22 which is arranged to afford operation of a motor control 23 of the adding machine which then operates to utilize the digital information stored in the pin box 21 in accordance with controls set up by a program control 24. The program control 24 is arranged to control the selection of the adding and non-adding entry functions of the adding machine, the printing function, and also the function of the check control 22 as well as controlling a read-out mechanism 25 which is connected through a table 26 to a key punch 27 for transmitting the information stored in the read-out 25 to the key punch for the punching of cards or tape. In the event that the program control 24 is set to omit the function of the check control 22, the information from the pin box 21 is transmitted directly to the read-out 25 with or without the operation of the adder indicated at 28, depending upon the program selected; in either case the transmitting function is effected by operation of the printer 30.

Thus a proof tape may be produced by operation of the adding machine by starting with a zero balance in the adder, then inserting a pre-listed total into the keyboard and subtracting that quantity from the cleared total, then depressing the subtract key and proceeding with the recording of each individual transaction of the series effecting this total, and tabulating that series of entries. The adder will be restored to zero in event balance proof actually exists, and commanding a total from the adder 28 will cause printing of an asterisk representing total and no finite amount. Conversely, if a finite number appears by the total sign, it will represent the exact sense and magnitude of the deviation from true balance.

During the operation of the system, code numbers of accounts and various other identifying symbols, codes or numbers are inserted in the printer and in the read-out mechanism for direct transmission without actuation of the adding machine adding mechanism, but each coded number which has self-checking digit characteristics may be verified or proved by operation of the control 23 which has been set up to operate in accordance with the pre-selected code, the check control for the system having been designed to operate in accordance with the code selected for the system.

The read-out device 25 includes a memory device or storage mechanism which is set up upon operation of the adding machine either with or without the adding function and with or without the operation of the self-checking device 22, the digital information being stored in the device 25 upon operation of the control 23 which is normally a motor bar or actuating element of the adding machine. Depending upon the program selected by the control 24, the information stored in the device 25 may or may not be transmitted through the cables 26 for recording on the punch card machine 27. The key punch 27 is proposed with a master card punched in accordance with the program to be followed. The system of the invention includes a scanning device for transmitting the information on the memory device 25 to the key punch to set up the key punch by actuation of the interposers in a manner well known in the art; the scanning device is driven in synchronism with the master card.

The preferred embodiment of applicant's invention has been illustrated herein as applied to a Model 024 IBM key punch and an Addo adding machine Model No. 341 E.S.C., both of which machines are well known and are presently available on the market. The IBM key punch is leased and also sold by International Business Machines, Inc. of New York City, New York, and the Addo adding machine is manufactured in Sweden and sold in this country by Addo X Inc., 300 Park Avenue, New York City.

Figure 2:
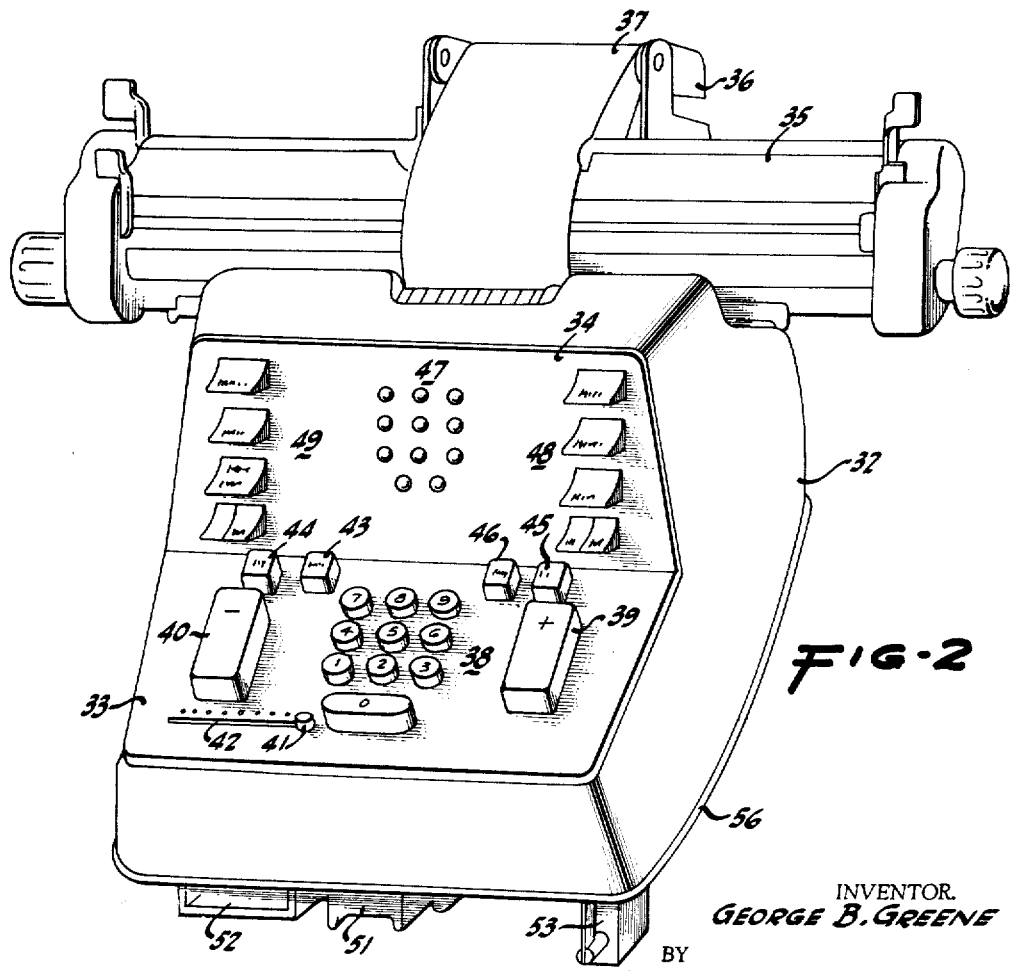
FIG. 2 is an enlarged perspective view of the adding machine when lifted from its supporting table.
Figure 3:
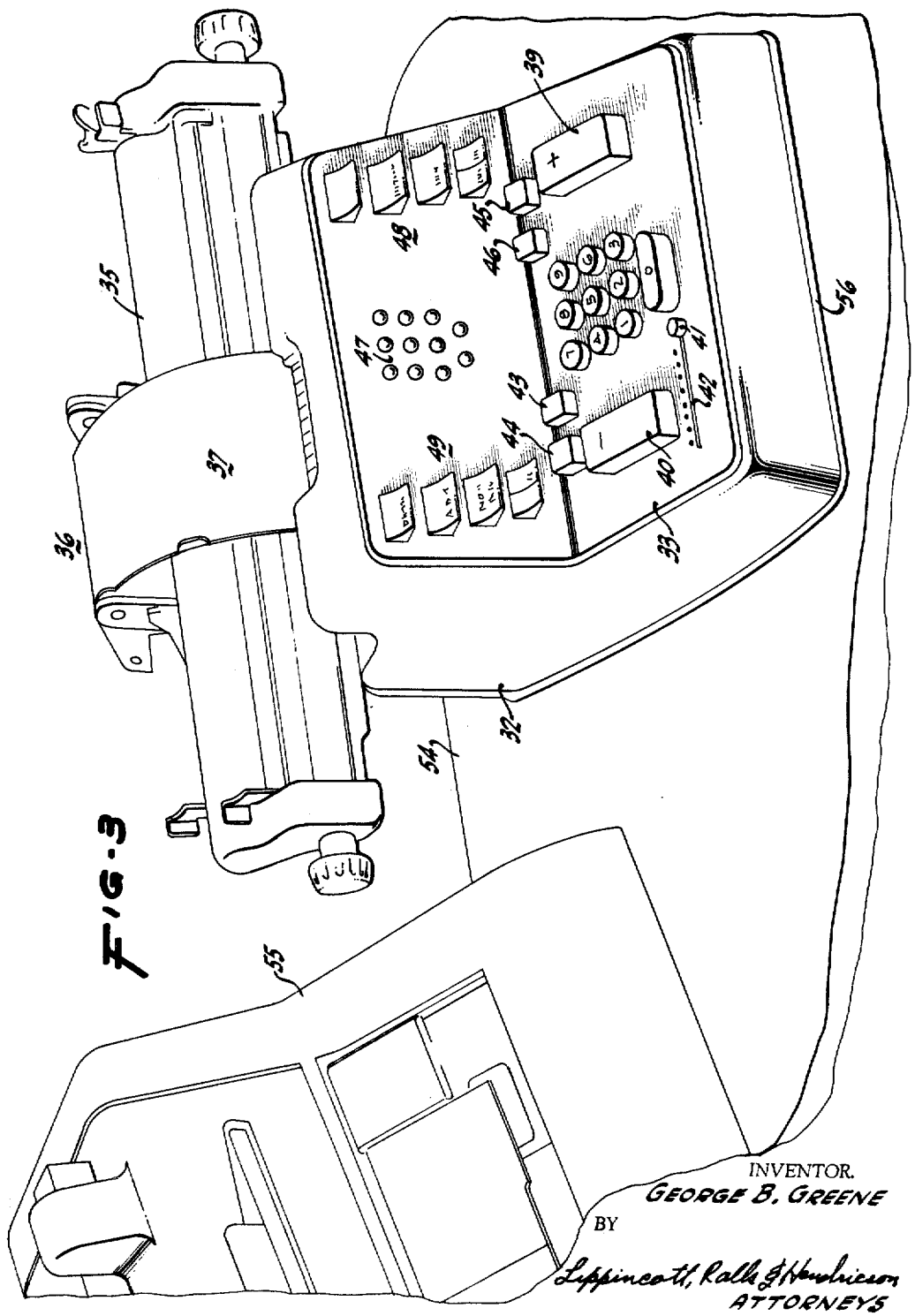
FIG. 3 is a perspective view of the adding machine and a portion of the key punch and table of the system embodying the invention.

As illustrated in FIGS. 2 and 3, the adding machine has been incorporated in a case 32 which has been substituted for the case regularly provided by the manufacturer. The keyboard of the original machine is employed as indicated at 33 and an additional control and pilot light panel 34 is positioned on the case 32 above and at an angle to the keyboard 33 to provide the controls and signal indications for the system of the invention. The adding machine is provided with a carriage 35 which makes it possible to employ ledger sheets for entries from the machine; and, in the present application, the carriage is employed with a tape feeding and supply assembly 36 which is arranged for the printing of two tabular columns of digital information. The carriage 35 may be operated to move the paper, in this case a tape indicated at 37, in substantially the same manner as normally used in handling a sheet of paper in a typewriter. In addition to this, the functions of the carriage are also controlled in a manner later to be described in order to secure certain automatic functions of the machine.

The main keyboard 33 is provided with the standard ten keys indicated generally by the numeral 38 and with the actuating keys or motor bar operators for the adding and subtracting functions as indicated at 38 and 40. A reset or clear key 41 is provided which moves in a slot 42 and advances one step to the left upon the depression of each of the keys in the panel 38; it may be cleared at any time by moving the button 41 to its extreme right-hand position. The usual repeat add and repeat subtract keys are indicated at 43 and 44, respectively, and the total and subtotal keys at 45 and 46.

The panel 34 is provided with a set of signal lights grouped in the same arrangement as the keys of the panel 38 as indicated at 47, the zero key being represented by two lights which operate simultaneously. On the right and left ends of the panel 34 are sets of control keys 48 and 49 which are arranged to control various functions of the apparatus to be described below.

Various electrical and mechanical components of the system of the invention are arranged within the case 32 or in operative relationship to the adding machine. In order to provide the additional space for the location and support of these components, a base structure is mounted at the bottom of the adding machine frame and serves as the support of the modified equipment. One portion of the frame can be seen in FIG. 2 at the bottom as indicated at 51 and two of the control solenoids are also visible in this view at 52 and 53.

The modified adding machine is preferably mounted on a table indicated at 54 in FIG. 3 which in turn is supported on the key punch, a portion of which appears at 55. This table arrangement provides a simple unified support for the adding machine adjacent the key punch and affords a convenient location for the reference material which the operator is using. The table 54 takes the place of a standard table provided on the 024 key punch and which normally supports the keyboard or control unit of the punch, this unit being connected with the main punch mechanism through an electrical cable in the usual manner. The standard punch keyboard is not essential for normal operation of the apparatus of the present invention and the standard key unit may be placed at any convenient location out of the way when the apparatus of the present invention is in use. The table 54 provides a convenient support for the standard key control whenever it is required for testing or servicing or for other purposes, such as the use of the key punch independently of the adding machine. The adding machine in its case 32 is mounted over an opening in the table 54 into which the components indicated in FIG. 2 project and directly under which is attached a shallow open-topped box or enclosure (not shown) in which is mounted an additional assembly including certain of the circuitry and controls for the programming unit to be described later.

Figure 4:
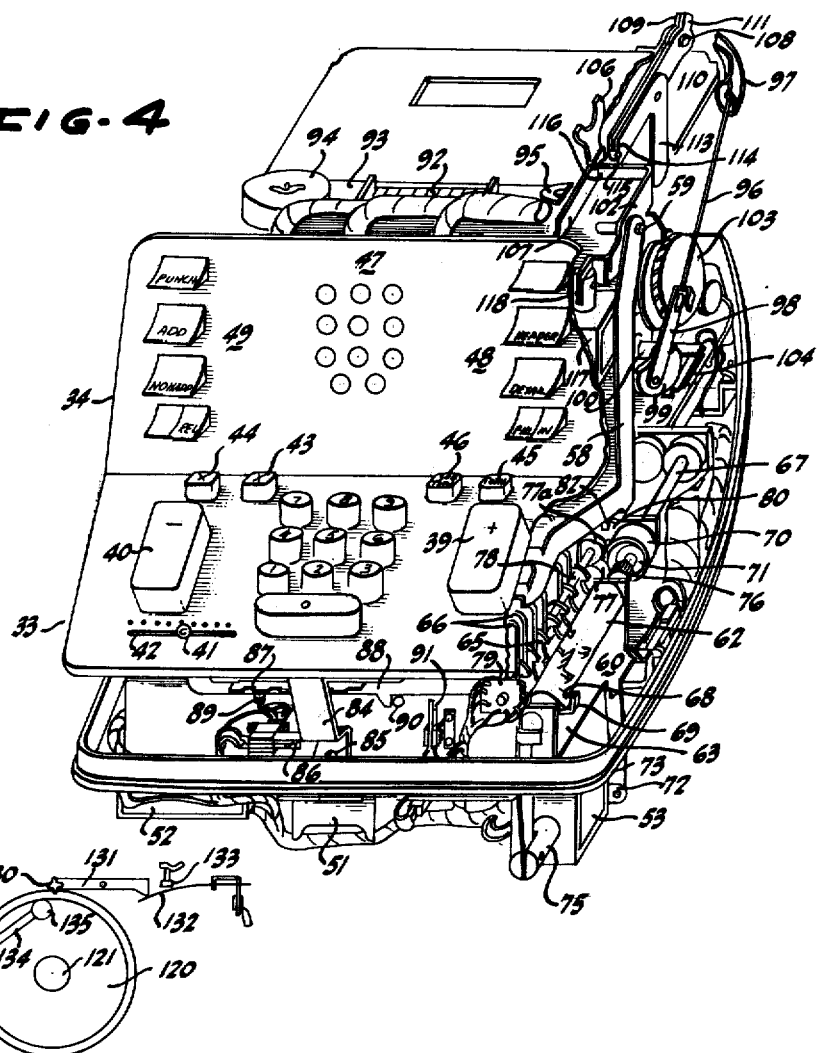
FIG. 4 is an enlarged view of the adding machine with the case and carriage removed and portions of the machine cut away to show the mechanism thereof.

In FIG. 4 the adding machine has been shown removed from the table 54 and with its case and the carriage 35 removed in order to show certain components of the actuating mechanism. In this view the frame member 51 is shown attached to the main base or frame indicated at 56 and on which the adding machine is supported. The case 32 when placed over the machine fits about the outer face of the frame 56 and rests on a bead or flange extending about the lower edge of the frame, this bead appearing between the case and the top of the table in FIG. 3.

As shown in FIG. 4, the add key or bar 39 is attached to one end of a lever 58 which is the motor bar of the adding machine and is of a general dogleg shape, it being pivoted to the adding machine frame on a shaft 59. Located generally in the right-hand front corner of the adding machine assembly there is a checking device indicated by the numeral 60 and which is provided in order to prove or validate codes or account numbers of the self-checking type.

As illustrated in FIG. 4, the device 60 as illustrated comprises a drum or cylinder 62 mounted for rotation and limited axial movement between the legs of a U-shaped bracket 63. Bracket 63 is pivotally mounted so that the drum or cylinder 62 may be rocked from the position in which it is shown to a position toward the left adjacent and in alignment with the line of pin hammers of the adding machine, seven of which are indicated by the numeral 65. Only seven of the hammers and their corresponding driving keys indicated at 66 have been illustrated in order to show them clearly and avoid the crowding which would occur were all ten of the units illustrated. Each of the hammers has a catch or detent formed thereon for engagement with lugs on the cylinder 62; these hammers may be constructed by adding the catches to the hammers supplied by the manufacturer.

The cylinder 62 is arranged to be rotated in a clockwise direction as viewed in FIG. 4 by connection with a continuously rotating shaft 67 driven by the motor of the adding machine. In the position shown the cylinder 62 is held from rotation by engagement of a stop finger or lug 68 and a stationary stop member 69 which holds the cylinder in its zero position. The driving connection between the shaft 67 and the cylinder 62 is made through a friction clutch comprising an outer cylinder 70 secured to the shaft 67 and a somewhat smaller inner friction wheel or puck 71 mounted on the shaft of the cylinder 62 and arranged to engage the inner surface of the cylinder 70 when in either of two extreme positions. In the position illustrated, with the lug 68 in engagement with the stop 69, the rotation of the cylinder 62 is prevented and the friction wheel 71 and inner surface of the cylinder 70 are in slipping engagement urging the stop lug 68 on the drum 62 against the stop member 69.

Still referring to FIG. 4, when any one of the keys for the digits 1 through 9 is depressed, the corresponding one of the hammers 65 moves toward the cylinder 62 into a position in advance of the other hammers. At the same time, the solenoid 52 is energized and rocks the bracket 63, the armature of the solenoid (not shown in FIG. 4) being connected through a link 72 with the lower end of an arm 73 of an actuating linkage attached to the bracket 63.

Figure 5:
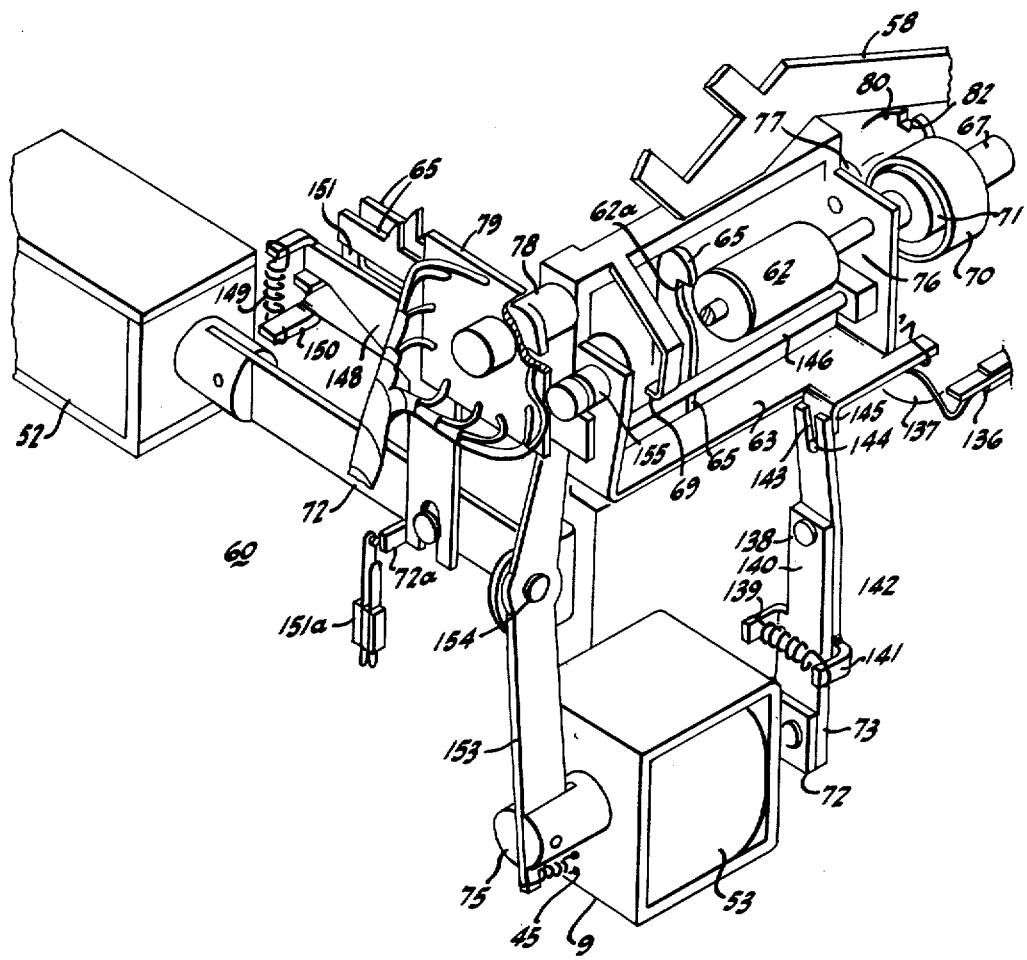
FIG. 5 is an enlarged detail perspective view of the self-checking mechanism of the system.

Now referring to FIG. 5, the actuating linkage is constructed and arranged in a manner to be described later, so that movement of the link or bar 72 to the left in FIG. 5 moves the cylinder or drum 62 to the left also. When it is in its left-hand position, the cylinder or drum 62 is rotated by engagement of the left-hand side of the friction wheel or puck 71 and the inside of the cylinder 70 so that it is rotated to bring one of a plurality of lugs or stops 62a on the drum 62 which are arranged opposite corresponding ones of the hammers 65 into engagement with its respective hammer. The cylinder 62 is provided with axially displaced pairs of stops or lugs, one pair adjacent each of the hammers 65, and the lug of each pair which is to be engaged with the hammer catch is selected by axial movement of the cylinder 62 between two positions under control of the solenoid 53. The armature of the solenoid 53, indicated at 75, moves the cylinder 62 forward between the arms of the bracket 63 and positions the rear one of each pair of lugs on the cylinder for engagement with its respective hammer when that hammer is actuated.

Referring again to FIG. 4, the stops on the cylinder 62 are positioned in accordance with the specific self-checking code which is being employed, and the one set of stops will result in an entry of the same digit value as the depressed key, whereas the other will provide a weighted digit value instead of the actual digit of the key. Whenever the cylinder 62 is tilted to the left, a gear 76 on the continuously rotating shaft 67 of the cylinder engages a similar gear 77 on a shaft (not shown) mounted to the left of the cylinder 62 and parallel thereto and arranged to rotate a control cam 80. The gears 76 and 77 are identical except that the gear 77 is longer to afford axial movement while the gears are meshing; thus the shafts are driven at the same speed, and an additional shaft 78 is driven by the gear 77 through another gear 77a of the same size with which it is in continuous engagement so that the shaft is rotated in synchronism with the gears 76 and 77 and has the same angular displacement as the cylinder 62. A rotary switch assembly 79 is driven by the shaft 78 and acts to control the pilot light on the panel 34 in a manner to be described later.

Still referring to FIG. 4, the cam 80 is provided with a notch or recess 82 in its periphery and only when the notch 82 is facing upwardly toward the motor bar 58 can the motor bar be pressed downwardly for operation. In all other positions of the cam 80 the motor bar 58 is locked out and the adding machine cannot be operated. The assembly including the switch 79 and cam 80 provides a summation device or digital information accumulator.

The foregoing brief description of the checking device will be amplified in connection with detail figures to be described below.

Still referring to FIG. 4, the stem of the zero key extends downwardly at the front of the machine, as indicated at 84, and has a guide slot 85 fitting a stationary pin (not shown). When the zero key is depressed, the stem 84 actuates a switch 86 which opens the circuit of the solenoid 52 and prevents its operation. This control prevents unnecessary operation of the cylinder 62, since the keying of the zero requires no advance of the digital summation device.

Still referring to FIG. 4, the clearing key of the adding machine, indicated at 41, which moves along the slot 42 advances one step from right to left for each digit entered by operation of the keys. In a code employing alternately weighted digits the self-checking operation involves the addition of digits with each alternate digit having a weighted value such that the total of all digits will be a multiple of a selected digit.

Still referring to FIG. 4, the purpose of the pairs of lugs provided on the cylinder 62 is to include in the operation of the checking device the alternate values of each digit, and in order that the checking device may be actuated in accordance with an alternate code, a shifting cam 87 is attached to the clearing bar indicated at 88 and to which the clearing key 41 is attached. This construction is more clearly illustrated in FIG. 11. The cam 87 provides alternate high and low faces for operation of a switch 89 controlling the solenoid 53 (FIG. 4). Referring again to FIG. 4, the solenoid is thus energized alternately as the clearing bar progresses upon operation of the keys, and in alternate positions moves the cylinder 62 axially forward to place the alternate lug of each pair in position for engagement with the respective hammer catch. When the clearing bar 88 is moved to its extreme right-hand or clearing position, a switch-actuating element 90 (FIG. 4) engages a switch 91 which is the clearing control switch of the adding machine.

Still referring to FIG. 4, the printing bars of the adding machine are indicated generally at 92 (FIG. 4) and are arranged to operate with a printing ribbon 93 bearing against a platen and fed in the usual manner between spools 94 and 95. In the illustration the carriage has been removed to show the mechanism below it; however, a flexible cable 96 which is arranged to move the carriage against its return bias has been shown in its normal position extending through a guide 97.

The lower end of the flexible cable 96 is attached to a retainer bar 98 which is pivotally secured to a plate 99 which in turn is rotatable on a shaft 100. Upon operation of the motor bar 58, a clutching device 102 releases a gear 103 which rotates through one revolution whereupon it is again stopped by the clutching device 102. The shaft 100 is driven by gears connected with the shaft of the gear 103 so that the shaft 100 rotates through one-half a revolution for each revolution of the gear 103. Thus when the gear 103 rotates once, the shaft 100 rotates through 180° and moves the link 98 to a position opposite that illustrated in the drawing. The two positions of this link and attaching mechanism for the cable 96 determine the two extreme positions of the carriage 35. When the cable 96 is drawn to its lowermost position as indicated in FIG. 4, the carriage 35 is moved to its extreme right-hand position so that it will print in the left-hand tabular column on the tape 37. When the motor mechanism is again rotated through one revolution the cable is released and moves to its 180° opposite position whereupon the carriage 35 moves to its position for entries in the right-hand tabular column.

The left-hand tabular column is employed for listing account numbers, identification numbers and the like, and when the carriage is in this position the adding machine is prevented from performing the adding operation by the actuation of a single-pole double-throw switch 104 which is engaged by the plate 99 in its lowermost position.

In order to control the line feed of the adding machine carriage, a fork 106 is provided which projects above the top of the mechanism as shown in FIG. 4 and lies in a position to engage the ratchet bail of the carriage. Upon forward movement the fork 106 actuates the ratchet bail to effect a movement of the platen of the carriage one space, thereby to move the tape and prepare for the next lower entry. A bar 107 extending across the upper portion of the mechanism and pivoted on a pin 108 is the adder control bar. A cam follower 109 is provided on the outer rear end of the bar 107 and is engaged by the non-add cam (not shown) on the carriage. When the non-add cam engages the follower 109, the bar 107 is lifted at its front end and moves out of engagement with the pin (not shown) which allows a gear on the adder to move into engagement with the driving gear and effect the adding operation.

In the present system in order to provide a more flexible line feed control, an additional pivotal link 110 having a cam follower 111 is provided and has pivoted to it a bell crank lever 113 provided with an upwardly opening recess 114 for engaging a pin 115 on the ratchet yoke 106. Bell crank 113 is arranged to be positioned in accordance with the position of operation of the main cardioid power cam of the adding machine. The linkage is further controlled by connection with a finger 116 attached to the rocker 102 of the one-turn clutch mechanism for the gear 103 and which is actuated by a solenoid 117 having an armature 118.

The solenoid 117 is actuated each time it is desired to change from one tabular column to the other. When it is actuated it releases the one-turn clutch so that the flexible cable 96 and therefore the carriage is moved to the opposite position from what it has been in. The arm 116 by engagement with the linkage for operating the yoke 106 prevents the line feed or ratcheting operation when the change is from the left-hand or identification column to the right-hand or quantity column; thus after an account has been identified the first entry appears on the same line as the account number. Thereafter further quantity may be entered in the right-hand column until the next change to the identification is acquired whereupon the solenoid is operated again, at which time the yoke 106 operates to ratchet and line feed the platen. The manner in which this mechanism works will be pointed out in detail below.

Figure 4A:
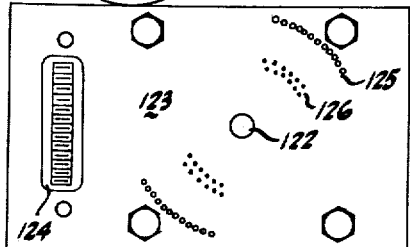
FIG. 4a is a top view looking down on the key punch and showing the scanner and master card drive.

The digital information fed into the calculator by operation of the keys is transferred to a second memory or information storage device arranged in the lower portion of the base and not shown in FIG. 4. This device includes a read-out mechanism and is provided with a commutator for preparing circuit connections for key punch control which are successively connected to the key punch by a scanner mounted on the key punch and driven in synchronism with the master card drive of the key punch. The arrangement of the scanner and master card drive is illustrated in FIG. 4a which represents a top view looking down on the key punch.

The master card is mounted on a cylinder 120 on a shaft 121 which is rotated at a predetermined speed. A second shaft 122 is connected to the shaft 121 by a one-to-one gearing for driving a scanning mechanism 123 mounted at one side of the master cylinder. The leads from the commutator of the adding machine are carried through a cable to a plug connection 124 on the scanning device and are then connected to the required contacts in two rings of contacts 125 and 126. These two rows of scanning contacts provide contacts for supplying information to all the columns of the punch card employed, which for the IBM is an eighty-column card. The outer row 125 is connected to supply the required digital information for the punching of the cards, and the inner row supplies corresponding required control information.

The master card, which moves in synchronism with the scanner, is wrapped around a cylinder 120 and clamped in position so that star wheels, one of which is indicated at 130, may follow the surface of the card and drop into grooves in the cylinder (not shown) whenever a punched hole lies in the path of the star. When a star wheel drops into one of the perforations, an insulated rocker arm 131 on which it is mounted pivots in a counterclockwise direction as viewed in FIG. 4a and a switch element 132 moves against a contact 133 and closes a control circuit of the key punch. The master card held on the cylinder 120 is clamped in place by the operation of a clamping lever 134 which rotates a clamping shaft at 135 and will be recognized as a device employed on the IBM key punches. The details of mounting arrangements and controls of the IBM key punch have not been illustrated as their operation is well understood and the details are not necessary to an understanding of the present invention.

From the foregoing it is apparent that the mechanical arrangement of the computer of this invention is compact and yet provides a wide range of control functions for accounting operations and for incorporating a key punch or other recording device to transmit and record the tabulations and computations set up on the adding machine. The two sets of control levers 48 and 49 on the upper panel 34 actuate electric switches for selecting various functions and control arrangements of the system and the nature and arrangement of these controls will be described later in connection with the circuit diagram. The details of construction in operation of the several devices set forth in the foregoing general description will now be taken up in order.

*Self-Check Computer*

The details of construction of the checking device 60 and its mode of operation are indicated in FIGS. 5 through 15, inclusive. By way of example the present invention has been illustrated as applied to an accounting system employing self-check numbers of the so called "modulus ten alternately weighted with carry" code. In accordance with this code, the digits are added in checking and each digit is either added in at its own value or at a weighted value depending on its position in the code number. In accordance with this code the next to the last and alternate digit to the left of the next to the last digit are weighted while all other digits are added in checking at their own values. In weighting the digits in this system, digits from 1 through 4 are entered at double their actual value and digits from 5 through 9 are doubled the ten dropped and one added to the double figure thus the double values for the digits 5, 6, 7, 8 and 9 are respectively 1, 3, 5, 7 and 9. Thus in the code the double digits in order corresponding to the digits 1 through 9, respectively, are 2, 4, 6, 8, 1, 3, 5, 7 and 9. Therefore, as keys are depressed to enter, for example, customer account number 1234567 the check-ing device will add the digits 1438537 totalling 31. Obviously, if the operator transposes digits, different digits will be weighted and the sum will be different. Thus, the code numbers exaggerate errors and lessen the possibility that compensating errors will occur. It is for the purpose of utilizing this code that the checking device 60 is provided with the alternate high and low face cam 87 which signals the digits which are to be doubled and further is provided with the pairs of lugs on the cylinder 62, one lug of each pair representing the digits at its own value and the other lug at its weighted or double value.

In this position the solenoid 52 has been energized by closing of a switch 136 actuated by the all bail 137 which moves in response to operation of any of the digit keys 38. The solenoid when energized draws the bar 72 to the left thereby pivoting the link 73 about a fixed pivot 138 at its upper end which is suitably secured in the frame of the machine. The rotation of the link 73 moves a lug or arm 139 to tension a spring 140 and move a lug 141 attached to an upper pivoted link 142 so that this link which is also pivoted on the fixed pivot 138 rotates in a clockwise direction and by engagement of a fork 143 at the upper end of the lever 142 moves a pin 144 attached to a downturned lug 145 on the bracket 63 so that the bracket is rotated about its mounting shaft indicated at 146 and moves the cylinder 62 toward the line of key hammers 65. This same movement of the shaft 72 to the left rotates a bell crank 148 in a clockwise direction about its pivot thereby stretching a spring 149 and lifting a lug 150 which is attached to a pivoted arm 151 which engages the lower sides of two of the pin hammers and holds this engagement and upper pressure by the link 51 prevents further actuation of any of the pin hammers of the key assembly and this prevents any further depressing of digit keys. The actuation of the solenoid 52 also moves a lug 72a into position against an actuating arm of a switch 151a which energizes a time delay circuit in a manner to be described later and prevents de-energization of the solenoid until sufficient time has elapsed for the actuation of the cylinder 62 to be completed. Each operation of the solenoid 53 depending upon the position of the cam 87 rotates a link 153 about a pivot 154 and moves the cylinder 62 axially of the bracket 63 by engagement of the upper end of the link 153 with a grooved shifting drum 155.

The rotation of the drum 62 has then moved the shaft of the gear 77 and switch assembly 79 a number of tenths of a revolution corresponding to the digital value of the key which had been pressed. The switch assembly 79 is the control switch for the lights on the center of the panel 34 and is provided with two sets of contacts arranged in rings one on one side of the assembly and one on the other. These two sets are employed to alternatively light digit indicating lamps and are useful in reconstruction of incomplete codes to be described below.

Referring now to the diagrammatic views 6 and 7, the manner in which the checking device is operated upon actuation of a digit key is illustrated in FIG. 6 showing the mechanism before depressing of the key and FIG. 7 indicating the operating condition with the key depressed and the pin in the pin box set. In FIG. 6 the key indicated at the end of the key bar 66 in its upper position and in engagement with the pin hammer 65 the left end of which is in engagement with a pin 160 which is held by a biasing element or detent 161 in its lower or unoperated position. The all bail 137 engaging the shank of the pin hammer 65 and switch 136 are also indicated the switch 136 being in its opened position. The cylinder 62 is indicated with one stop 62b in its position when the cylinder 62 is in its inactive zero position. When the key is depressed it rotates the key bar 66 in a counterclockwise direction and thereby rotates the hammer 65 in the clockwise direction and raises the left-hand end to lift the pin which is retained in a set position by the detent as indicated. Upon this operation the all bail 137 closes a switch 136 and the solenoid 52 is energized to draw the bar 72 to the left and actuate the linkage for swinging the cylinder 62 to the left. This linkage has been illustrated as having pivots 138, 144 and 146, however, it is diagrammatic as will be understood upon an examination of the same linkage as illustrated in FIG. 5. As soon as the cylinder 62 moves to the position shown, it is spun around so that the stop or detent 62 engages the hammer catch 65 whereupon it is stopped in the position shown in FIG. 7.

The operation of the self-checking computer when the clearing bar is actuated to clear the machine, the diagrammatic view of FIG. 8 shows the relationship of the check device cylinder 62, the clear bar 88 and a control drum 163 which is secured on the shaft 78 adjacent the switch assembly 79 and which is provided to reset the switch assembly to zero when the machine is cleared. As shown in this figure the cylinder 62 has moved to the right where it has stopped in the zero position with the zero lug in engagement with the stop 69. The drum 163 is shown with its stop lug on the right hand side. When the clearing bar 88 is moved to the right by the clearing key 41, the bar engages a pivoted catch member 164 which engages at an actuating element 165 of a normally open switch 166. When the element 164 is rotated in a clockwise direction by engagement with the bar 88, it closes the switch 166, energizes the solenoid 52 and actuates the linkage to move the cylinder 62 to its left-hand position to drive the shaft 78 in a manner described heretofore. The element 164 has moved to a position where a catch indicated at 167 engages the stop lug 168 of the drum 163 and thereby returns the shaft 78 and the switch assembly 79 which is driven by it to the zero sum position as is indicated in the lower figure, FIG. 9. At the end of a predetermined time the time delay relay previously described which is in the circuit of the solenoid 52 deenergizes the solenoid which thereupon restores the cylinder 62 to its right-hand position and the cylinder is then driven until its stop again engages the stop 69 at the zero position. It is thus apparent that when the machine is cleared by operation of the clearing bar 88 the mechanism of the check computer is restored to its zero sum position with the cylinder 62 and the switch assembly driven by the shaft 78 restored to their zero positions.

FIG. 10 is enlarged view of the zero key and the mounting arrangement of its stem 84 and illustrates the pin which engages the slot 85 as indicated at 170. The switch 86 is provided with an actuating leaf 171 which is engaged by the lower end of the key stem 84 and is opened by keying to prevent energization of the solenoid 52 and its resulting carriage action which would not be useful when the zero key is pressed. Thus when the mechanism is in position diagrammatically illustrated in FIG. 9, actuation of the zero bar has no effect other than to set the zero pin by movement of the key bar indicated at 172 into engagement with the zero pin hammer (not shown) for the purpose of setting the zero pin and advancing the pin box.

FIGS. 12 and 13 show the two axial positions of the cylinder 62 under control of the solenoid 53. When the switch 89 is closed as indicated in FIG. 11, the solenoid 53 is energized and in the position of FIG. 13. Whenever the switch 89 is opened by having its follower indicated at 175 move into one of the lower cam surfaces of the cam 87, the solenoid 53 is de-energized and the cylinder 62 is returned to its position and shown in FIG. 12. In these two figures the cylinder 62 has been indicated generally by dotted lines and only two of the control stop discs have been shown in position. It will be understood that the cylinder may be made from a solid piece of material or may be built up from discs as suggested in these figures. When the cylinder 62 is in its right-hand position as shown in FIG. 12, the hammer bar 65 is opposite the left-hand control portion or ring indicated at 176 and when the switch 89 is closed to energize the solenoid 53, the cylinder 62 is shifted so that the hammer bar 65 is adjacent the right-hand ring or segment indicated at 177. The lugs or stops on the segments 176 and 177 are in different positions as indicated by the position of the lug 177a in FIG. 12 and by the lug 176a in FIG. 13. It will be understood that in the arrangement illustrated and described heretofore and shown in diagrammatic form in FIGS. 12 and 13, the left-hand control segments 176 is arranged to represent the digit values which are used directly in the coding system whereas the control segment 177 has its lug 177a positioned to insert in the coding summation a weighted value of the digit selected by the key depressed for positioning the hammer 65 as shown. In FIGS. 12 and 13 the several hammer bars 65 have been illustrated as pivoted on a common shaft 178, this shaft being a portion of the adding machine key and hammer bar assembly.

Figure 14:
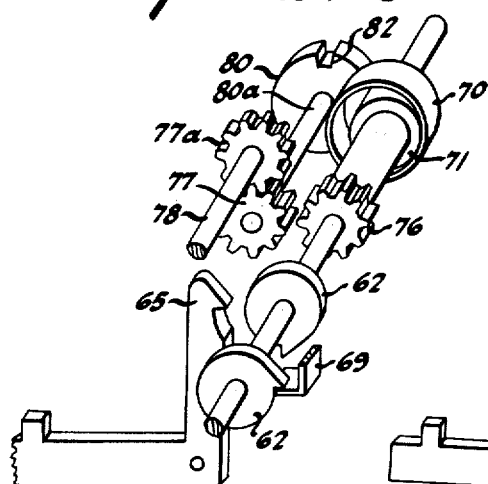
FIGS. 14 and 15 are enlarged detail perspective views of the friction clutch and gearing of the checking device.
Figure 15:
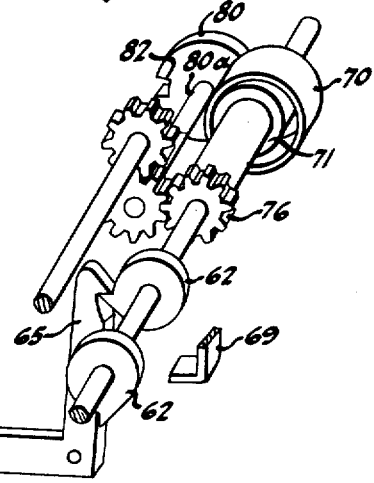

FIGS. 14 and 15 are somewhat diagrammatic perspective views of the gearing and drive assemblies for the cylinder 62 and the associated parts of the check computer mechanisms. FIG. 14 illustrates the relationship of these parts when the friction wheel or puck 71 is in its right-hand position and the gear 76 is disengaged from the gears 77 and when the zero stop or lug of the cylinder 62 is in engagement with the zero stop 69. FIG. 15 illustrates the assembly when the gear 76 has been moved to the left with the puck 71 in engagement with the clutch 70 so that the gear 76 drives the gear 77 and 77a. In FIGS. 14 and 15 the shaft on which the gear 77 and cam element 80 are mounted is shown at 80a.

The operation of the line feed linkage for controlling the ratchet bail fork or yoke 106 is diagrammatically illustrated in the four FIGS. 16, 17, 18 and 19. In FIG. 16 the ratchet bail indicated at 180 has been urged for this operating position by the fork 106, the pin 115 of which is free from the release or locking armature 114. In this position of the linkage the solenoid 117 is deenergized and the arm 116 is in a lower position. When the solenoid 117 is energized it draws its armature 118 down and tilts the finger 116 upwardly about pivot 59 and the bell-crank 113 is raised somewhat about the fixed pivot at its left end indicated at 181. Here again the recess 114 is not in a position to engage the pin 115 and the ratchet bail 180 is actuated. When the main cardioid cam of the adding machine rotates to a position as indicated in FIG. 18 where the cam is shown at 182, the bell-crank 113 is rotated in a counterclockwise direction and the link 110 is lifted further about the pivot 181. In this position even though the link 110 is depressed by engagement with the non-add cam of the carriage indicated at 183, the pin 115 nevertheless remains out of engagement with the recess 114 and the ratchet bail is actuated to line feed the adding machine tape. When the mechanism is in the position shown in FIG. 19 the carriage non-add cam being in a position against the cam follower 111 to raise the link 110 as indicated, and when the solenoid 117 is energized to raise the finger 116 at the same time that the cardioid cam 182 is in its extreme position to rotate the bell-crank 113 to the left, the pin 115 is engaged in the recess 114 and the yoke 106 cannot move forward to allow actuation of the ratchet bail 180.

*Information Storage and Readout Mechanism*

Underneath the adding machine within the frame structure there is mounted a second memory device from which information is transmitted to the key punch. This device is charged with digital information by operation of the adding machine printing mechanism after the checking operation has been completed in those cases where it is employed. This storage and readout mechanism is shown in the perspective used, FIGS. 20 and 21, the FIG. 21 being a bottom perspective view in which the digital information or representation storage devices are indicated generally at 185 and comprise a plurality of slidable bars mounted on cross rods 186 and 187 secured in a frame 188 which is attached by the ends of the bars 186 and 187 which project into bayonet slots 190 and 191 in the sides of a box or frame member 193. The bayonet slot arrangement assures release of the mechanism by first sliding it along the assembly and then after its release moving it directly away from the remainder of the assembly. The memory devices 185 are biased to their upper position as illustrated in FIG. 20 by a plurality of tension springs 194 only one of which is shown in the drawing, the remaining ones being omitted in order to give a better view of the mechanism behind them. Each of the bars 185 comprises a strip or shank provided with upper and lower slots 195 and 196 for accommodating the shafts 186 and 187 respectively in sliding movement. Each of the bars carries an insulator 197 adjacent the end of the slot 195 and which carries a pair of spring contact fingers 198 for bridging contact elements in a printed circuit on plate 200 mounted in a metal frame 201 on the side of the frame 193 opposite the recording bar assembly. Each of the bridging contact assemblies mounted in the insulators 198 comprises 2 bridging feet, both of which contact the same circuit elements and therefore decrease the likelihood that the circuit will be broken during operation of the mechanism. When the storage mechanism is in position in the base of the adding machine, a plurality of fingers one for each of the bars 185 which fingers are actuated by the adding machine are arranged to engage the ends of the bars as indicated at 202 and upon operation of the adding machine these fingers move against the ends of the bars 185 and each finger moves its respective bar a distance determined by the digital information supplied from the adding machine by these fingers. After the bars have been set in place by the information from the adding machine, they are locked in their set position by a locking bar 205 which falls into the spaces between teeth 206 formed in the top sides of the bars 185 and thereby maintains the bars in alignment in their positions as selected by operation of the fingers 202. Plate 200 may be moved into or out of engagement with the spring fingers 198 and when in engagement, these fingers provide the circuit completions necessary for the operation of the key punch when it is conditioned to receive information from the adding machine or computer. The actuating mechanism for moving the circuit plate 200 toward and away from the information unit or matrix is shown in FIG. 21 which illustrates this mechanism removed from the frame member 193. As shown in this figure, the plate 200 is mounted between two half frames or bails 207 and 208. Bail 207 is mounted on a fixed axis within the frame 193 on stub shafts or pins which pass through a pair of openings or bearings 209, one of which appears in FIG. 20. The bail 208 is similarly mounted in a pair of bearing holes 210 on pins, one of which is indicated at 211 in FIG. 21. The space between the axes of the pins in the openings 209 and 210 is such that when the bails 207 and 208 are in position they may rotate through a limited angle within the frame 193 on their pivotal mountings. In order that the bails move in the same direction to carry the plate 200 toward or away from the contact matrix, the ends of the bails between the pivotal points are formed to provide tongues 212 on the bail 207 which enter recesses 213 in the bail 208. This construction provides a gearing between the two bails so that they move together, the projections 212 and recesses 213 acting as gear teeth. The plate 200 is secured to the bail 208 on tabs 214 and on pins 215 to the bail 207. The plate 200 is formed with an opening or recess 216 at its end within the bail 207 and this opening provides a passageway for the adding machine fingers 202 so that they may enter and engage the ends of the bars 185. The knife edge 205 shown in FIG. 20 is formed on the lower edge of the end member of the bail 208 as indicated.

A latching and control assembly is secured to one side of the bails 207 and 208 in order to control the manipulation of the circuit plate 200 in its relation with the contact matrix. This read-out assembly includes leaves 218 and 219 pivoted on the bails 207 and 208 at the bail pivots. The leaves 218 and 219 extend beyond the ends of their respective bails and have loops formed therein which are bent back and enter holes in the ends of the bail as indicated at 220 in the end of the bail 207. These loops ends make it possible to adjust the relative pivoted positions of the leaf members and their respective bails by twisting the looped ends to deform them slightly and effect this adjustment. The leaf element 218 carries an upwardly and laterally extending lug 221 and the element 219 carries a similar lug 222. These lugs pass through openings 223 and 224 in a rocker bar 225 and are biased toward one another by a tension spring 226, so that the bails 207 and 208 tend to fold upwardly about their pivots and thereby carry the plate 200 away from engagement with the fingers 198 of the commutator matrix. The leaf 218 also carries an upstanding lug and adjacent the lug 221 and the top of which is indicated at 227. A latching bar 228 is pivoted on this lug and carries a spring pressed foot 229 similar to a foot 230 provided on a bent portion 231 of the rocker bar 225. The bail 208 has formed on it an upstanding lug or post 233 having a pair of backwardly turned ears in which the shaft of the latching element 228 lies and to which it is locked in the locking position of the bails. The leaf member 219 is also formed to provide an upstanding portion having large and small ears 235 and 236 and it is also provided with a tapering extension indicated by the dotted line 237 and which is pivoted to the rocking bar 225 at 238. The rocking bar 225 is provided with an upwardly extending lug or extension 240 at its left end arranged for engagement with an actuating cam 241 on the adding machine and also with a forwardly and downwardly extending foot member 242 which acts to control a starting switch 243 of the control system.

Figure 22:
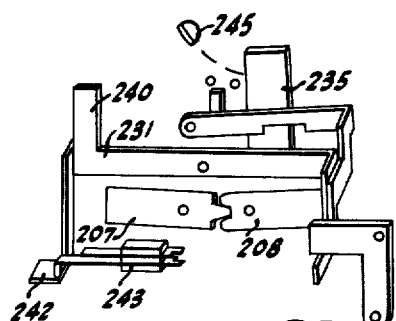
FIGS. 22, 23, 24 and 25 are diagrammatic views illustrating the operation of the control device of FIGS. 20 and 21.
Figure 23:
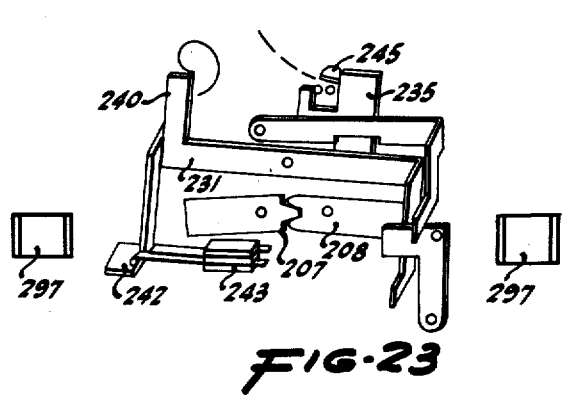
Figure 24:
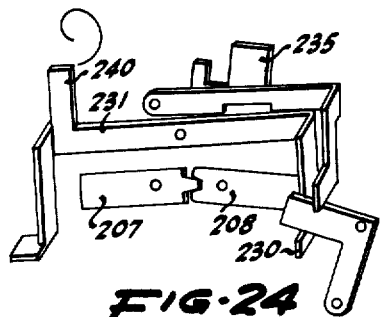
Figure 25:
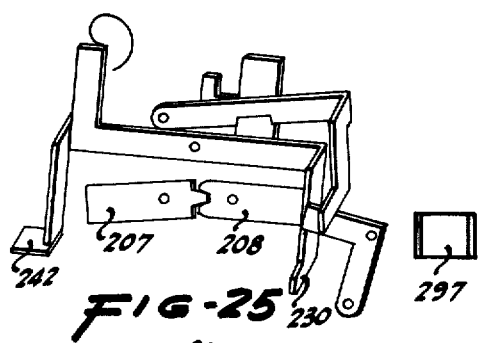

The operation of the positioning bails 207 and 208 for the circuit plate 200 is illustrated in FIGS. 22, 23, 24 and 25 where the essential elements have been indicated diagrammatically. In FIG. 22 the bails 207 and 208 are in their upward position holding the circuit plate away from the area of contact with the digital storage matrix. When the elements are in this position the driving arm or crank of the adding machine indicated at 245 moves downwardly along the arc indicated and engages the ear 235 and moves the bail 208 in a clockwise direction about its pivotal connection with the frame 193. This action lowers the plate toward contact with the matrix, this being the position illustrated in FIG. 23. In this position the switch 243 is closed by the lifting of the foot 242 as a result of engagement by the bail 208 with the foot 230 on the other end of the rocker bar 225 and the switch prepares the circuit for transmission of the stored information to the key punch when that machine is ready to receive it. When the mechanism in the position shown in FIG. 23 and the cam element 241 is actuated to press the finger 240 downwardly and rotate the bar 231 to lower the left end of the rocker, the other end of the rocker is raised so that the foot 230 bears against the arm of the solenoid rocker or bell crank and the mechanism remains with the plate locked in its downward position. If the cam 241 rotates further to release the upper end of the post 240, the opposite end will move downwardly thereby lowering the foot 230, however, the bails 207 and 208 will remain in their downward position to hold the plate 200 in position ready for read-out of the information from the storage mechanism.

*Operation of System*

Referring to FIG. 26 which is the schematic drawing of the present invention, a simple program as set up in this machine will first be described, and then followed through on a step-by-step basis in order to better describe the function of the electrical system represented in FIG. 26. The program unit consists of a stepper relay 277 in general, a stepping solenoid 278, a clear solenoid 279, and two ten-position sections of switches represented in the diagram by 280 and 281, respectively. A junction block employed in the preferred embodiment is made of dual taper pin fittings arranged in a decimal array, that is to say, with a group of rows of fittings, each row consisting of ten columns. The schematic diagram shows these dual connections as 270 through 276 and 282 through 284. The program unit further contains a diode matrix shown in general as 285, the purpose of which is to decode complex commands made up of four elements, namely, add, non-add, non-punch and self-check, and to derive electrical control signals from pins representing those commands when energized by the stepper relay. The program unit further consists of a relay 286 the purpose of which is to allow the operator to pick an alternate program represented by the connections to stepper switch bank 281, alternatively to the program represented by the connections to stepper switch bank 280. The program represented by the connections of 280 will be known as the main program, which will automatically stay in control of the machine until the relay 286 is picked through manual operation of switch 287 on the front control panel and whose actuating element bears the legend "header"; and, barring manual control of front panel switch 288, which bears the legend "detail." During the one-card cutting cycle, during which 287 was operated, the contacts of relay 286 which are wired to self-hold the relay in an operating condition, however, in series with the aforementioned detail switch 288 and switch 289 which is the IBM key punch Program Cam 2 switch, which opens automatically at the conclusion of each card. Thus when this header program is picked, it holds only for the duration of a single header card and automatically drops back into a non-operating condition of relay 286 transferring the control of the program back to the main program associated with the connections to stepper bank 280.

The application of this invention to an accounts payable operation will now be described. This will specify that it is desired that the header program will have a "total" action without punching, during which the total will be cleared to produce balance proof to any preceding entry that has been made. A zero total in the adding machine is prerequisite. Then will follow a self-check vendor code number since the end use of the header cards will be the disbursement function, in which the tabulating room will produce a check in behalf of that vendor solely from the header card. An add entry will come next during which the vendor's stated balance due is keyed and subtracted from our total in the process of auditing that invoice for payment. But now, after producing the disbursement card, a single card for each distributable item from that invoice will be required; that is to say, if certain portions of this invoice bear to one job category, other portions to others, distributions are individually cut into separate cards which can be sorted and tabulated by rapid and economical mechanical means. To this end it is specified that the detail program, which is represented by terminal 282, to be a self-check non-add entry representing a cost account distribution code 283, which will represent a quantity entry, therefore should be add and non-check and 284 stepper reset. Now the program will be made up with individual jumper wires with taper terminals atached to each end of the wire. One end of one wire is placed in 270, the opposite end in 271, representing add, (that is to be non-check and punch is implied). Another jumper wire is plugged into 271, representing the second step of the header program, and the opposite end is plugged into 272, which is non-add check (that it shall also punch is implied). Into 273, the third step of the header routine, one end of still a third jumper wire is placed the opposite end is plugged into 274, representing add, and implying that non-check and punch be carried out. Into 275, fourth step of the header routine, one end of a jumper wire is placed while the opposite end is plugged into 276, which is stepper reset.

The first step of the main program, which is taper fitting 282, is connected to either terminal 271 or 272 because it, too, is non-add, check and punch, similar to the second step of the header program. Likewise, 283 the second step of the detail program is connected to 273, which in turn was connected to add, with implied instructions to non-check and punch.

Terminal 284, third step of the detail routine is connected to 275, which in turn is connected to 276, stepper reset. To carry out a single accounts payable procedure, first header button on the front panel, see FIG. 4, 48 which operates switch 287, picking relay 268 which is self-holding through normally closed contacts of switch 288 and normally closed contacts of switch 289 which in the IBM schematic will appear as Program Cam Switch 2. Now if the total control on the adding machine keyboard is depressed, stepper switch bank 281, which is placed in control by relay 286, is now arming terminal 270 which in turn arms 271, with the command add and non-punch. The two diodes of diode matrix 285 which are connected to terminal 71 conduct with the result that bus connections 290 and 291 are grounded. Now since wire 290 supplies a ground path for shuttle solenoid 117 (see FIG. 4), however, in series with normally closed contact of non-add switch 294 located on the front panel, the ground is effective only if the manual non-add switch is not depressed. The ground current to shuttle operating solenoid 117 is served through a single pole to throw connection of shuttle switch 104 (see FIG. 4), which switch is directly operated by the shuttle cam 99 and is closed when the shuttle is in a non-add state and open to bus 290 when the shuttle is in an add state. Since switch 104 is displayed in an add state, no energy is supplied to shuttle magnet 117, which is to say it merely remains in the add position. Of course, if switch 104 has been in the non-add position, a current would have been caused to flow in shuttle solenoid 117, resulting in a shifting of the carriage to the add position.

Now as the second and final stroke of total reaches its peak, start switch 243 (see FIGS. 22, 23 and 24) is momentarily closed.

Referring to the upper contacts of start switch 296, it will be seen that as the switch is operated a through path is provided to the ground leg of the latch relay magnet 297 with the result that any number associated with the foregoing total will have been lost and not committed to punching.

Yet another function carried out by start switch 296 will be seen by referring to the lower set of contacts on that switch. Ground is brought to these contacts on start switch 296 through series current limiting resistor 330 to step solenoid 278 of stepper relay 277 by way of a normally closed switch on add switch 293 and non-add switch 294 which are front panel controls found in FIG. 4a under the general category of 49. If neither of these manual carriage control switches is depressed, this will allow stepper relay 277 to advance to the second step of the program.

Now the self-checking vendor code number is keyed while terminal 272 commanding non-add, self-check and implying punch is armed by the program stepper 277. Now two diodes out of diode matrix 285 contrive to connect to ground bus 295 commanding non-add and 292 commanding self-check.

But 292 is now at ground so that at the first keyboard key depression all bail switch 136 closes which allows in the series made up by the normally closed contact of time delay relay 298 and normally closed zero insertion switch 86, always assuming that the first key depressed was not zero, check solenoid 52 is caused to close, thereby closing normally open solenoid-operated switch 151a, whose action is as follows: 151a switch initiates the start of a time delay determined by condenser 299 shunting the work coil of relay 298 and in series with variable resistor 300. After a finite delay adjustable to just cover the maximum period of time required for a complete self-check cycle reaction time, relay 298 responds to this current, thereby opening its normally closed contacts immediately breaking the circuit to check solenoid 52 and opening switch 151a. The normally open contacts of relay 298 are wired to permit the relay 298 to stay closed just a moment longer than the check solenoid 52. As this was done it will be found that the weight of the digit first keyed will now be found in the answer shaft of the self-check device. Subsequent keyings will repeat the above procedure. After the final digit of the self-check account number has been keyed, the motor bar is depressed and if the code inserted through the keyboard is in every way valid, the motor bar will be allowed to depress and cause the number to be transferred through the printing device into the read-out device (see FIGS. 20 and 21.) As this code is stored in the read-out device, start switch 243 is again caused to close. The function of advancing the program step is the same as described above on the non-punch totaling cycle. However, the center contacts of start switch 296 are at first during the stroking of the adding machine found to not yet be energized by start delay switch 301 which is not closed to the circuit containing start switch 296 until the very end of the adding machine stroke, but at that time switch 301 does supply a ground to the center contacts of start switch 296 which then supplies cathode grounding to tube 302. Now, when and as the IBM key punch can supply an alpha signal which is a ground potential representing a one in the one's row of the control card (see FIG. 4a, 120 and 131), then tube 302 can conduct a current actuating relay 303; contact 303a now becoming closed connects the IBM punch clutch magnet to the IBM keyboard restore switch to initiate punching. This actually causes a single dummy cycle of the key punch during which time a p5 pulse is generated by a cam switch in the IBM machine. This p5 pulse is delivered to contact 303b, which in turn energizes and operates relay 306, which will serve to pick punch clutch relay 306, thereby severing its connection to the keyboard restoring bail switch of the key punch but at the same time will supply p5 pulses, one per serial digit as the transfer progresses, to the common terminal of the scanning switch which is now making a spatial selection of the columns of the read-out 308 which is translating each of these descending column numbers of the adding machine device to the digits found in the matrix in those respective columns and connecting in rapid sequence the ground to the various IBM interposers 12's, 11's, and all of the decimal digits as shown in 309 in the lower central portion of the schematic drawing.

Now as the pennies column of the adding machine is scanned, the final p5 pulse which passed through the scanning device 307 and the read-out device 308 and was translated into the corresponding digit found in the pennies column, does in addition interrogate the credit balance switch 310, and if it is found to be in a minus condition it will, in addition to punching the proper numeric value for the pennies column of the card, over-punch an x-punch (or elevens row) in that pennies column. In addition to this, the pulse finds its way up a bus connection 311 to a common terminal between relays 304 and 305. This grounding pulse will cause a momentary closing of relay 304, causing its contact to pulse relay 305.

Now as relay 305 is pulsed momentarily by the interrogation of the pennies column of the adding machine, the normally open contact of 305 closes, pulsing the latch magnet 297, thereby releasing the contents of the read-out device and bringing to a halt the punching operation by opening switch 296. The normally closed contact of relay 305, in turn, is momentarily broken, which breaks the plate bias supply to relay tube 302, causing relay 303 to fall out.

Now the program stepper 277 is found to be on step No. 3 of the alternate program, which is an add (with the implied command to non-check and punch). Therefore a single diode in the diode matrix 285 conducts to bus 290, which has only the effect of repeating the carriage control operation in step 1 above. Now a keying of the keyboard will not find an armed self-check computer and will be an ordinary entry with an uncontrolled motor bar and as the motor bar is depressed the contacts of the read-out represented by the keying will become stored in the read-out device and the punching process which will follow will be identical with that carried out in step 2 above, including the advancing of program stepper 277 now to step 4. Step 4, however, has been programmed to connect to terminal 276 which is a direct connection to stepper reset coil 279, which brings the program stepper back to its first step. In addition to this, the key punch will now have expelled the disbursement card which we have cut and header relay 286 will have been caused to drop out by Program Cam 2 of the key punch, restoring control of the program to stepper sector switch bank 280, representing the main program. However, since we have connected our first step of the detail or main program to the second step of the header routine, the second step of the main to the third step of the header, and the third step of the main to the fourth step of the header, we will exactly repeat the header routine with the exception of the non-punch totaling first stroke. This will result in a detail card for each reiteration of the main program. When the final part has been added back into the total representing the final distributable item from the invoice, the header control is again depressed, going into the header routine in direct repetition of above. However, now it will be found that if no balance error exists the proof tape will show an asterisk representing a total but with no finite balance being printed. Conversely, if the finite balance is found by this total sign, it will be the sense and magnitude of the total deviation from true balance.

In considering the possibilities of one of our self-check account codes having been erroneously written in the beginning, read by the operator or miskeyed by the operator, or in fact from any cause at all complete validity of the account code does not exist, a motor bar lock-up has resulted. This must be cleared by clearing the adding machine pin box with clear control 41, referring to FIG. 4. In so doing, clear switch 91 will be closed, causing solenoid 52 to engage and drive the self-check computer to a clear condition in the total section and in the process of restoring it will also clear to zero automatically in the entry portion of the device. Therefore it will be ready to accept a new entry with both a clear pin box in the adding machine and a correspondingly clear self-checking device.

However, now if we would consider the circumstance in which one of the digits of a self-check account code is obliterated or otherwise unreadable, those digits which are clear and readable are at first read and keyed into the keyboard in order up to the missing digit. Now at the missing or obliterated digit the fill-in key is depressed. This contrives to operate switch 311, which is the right-hand element of the fill-in key which operates the two switches 311 and 312 found in the general category of 48 in FIG. 4 in the lower position of that column of controls, whose function is to arm the neon indicators in the front panel indicated by 47 of FIG. 4.

Now as the left-hand element of this fill-in key, which operates the switch 312, is depressed, if even-odd switch 89 in conjunction with toggle switch 313, a single pole double throw switch whose position depends upon whether the total number of digits in the punching sequence is an even or an odd number, shows a through circuit, relay 314 will be actuated by the above operation on the fill-in key. If it is an unweighted entry the bias to this relay is not supplied through 89 and 313 and control of the ten key light panel 47 remains with the lower switch 79b representing the rear face of the switch assembly 79. However, if the relay 314 is actuated, control of the ten-key light panel is transferred to the upper switch 79a representing the front face of this switch assembly 79.

Now after punching the fill-in key, the remainder of the digits in the account number are keyed. Upon completing the punching sequence, the rotating arm of switch assembly 79 will have been rotated through a complete number of revolutions and tenths of a revolution equal to the total of the weighted and unweighted digits which were keyed with one decimal point applied to the total. Since the missing digit has not been included in the total keyed, the fraction of a revolution required to complete a full revolution of the switch 79 will represent the value of the missing digit. As can be seen in FIG. 26, the wiring connections between the contacts of the switch 79 and the digit lights of the panel 47 are complementary so that the final position of the switch 79 indicates the missing digit, the lower switch 79b having direct complementary connections, and the upper switch 79a having complementary connections for the proper weighted digit. Thus, the indicator panel will indicate which key should have been pressed at the obliterated digit interval in order that this be the unique account number which it originally was before obliteration took place, thereby saving a reference to the files.

*Printing Tape Supply and Feed*

On the carriage 35 and at the rear thereof there is provided a support for rolls of printing tape to be supplied to the adding machine and to be collected therefrom, as indicated at 36 in FIGS. 2 and 3. The details of construction of this device are more clearly shown in FIGS. 27 through 31. The rolls of tape for printing are arranged on spools mounted between pairs of lower and upper arms 316 and 317 and the rolls are indicated by dotted outlines in FIGS. 27, 28 and 29. The supply roll is mounted between the lower arms on stub shafts 318 and the lower arms are pivoted on adjustable brackets 319 and are provided with angularly cut faces indicated at 320 so that when the arms are swung upwardly from their pivots they spread apart and afford easy access for placing the rolls or spools in position between the arms. When the arms are restored they move inwardly and hold the rolls securely in place.

The upper arms are pivoted on lugs 322 formed on the lower arms adjacent their pivotal supports on the bracket 319 and the upper arms are provided with ball bearing wheels which act as retaining members for the taken-up spool which as indicated at 324 in FIG. 29, rests on the supply spool 325, and is held in engagement therewith by gravity and also by tension springs 326 which urge the arms toward each other. The brackets 319 may be adjusted along a slot 327 by loosening thumb screws 328 and sliding the brackets along the slot before tightening the screws again. The upper take-up roll is collected by inserting the end of the tape in a slot 330 in the hub of the roll, and as the tape is wound up on the spool by engagement with the supply 325, the used tape containing the accounting records is wound on the upper spool rather than being allowed to fall into a basket or other collecting means.

The drive is positive and assures an adequate take-up drive for many applications. In the event that insufficient driving force is found to exist between the paper and the supply and take-up rolls, a driving wheel 331 mounted on a hub 332 carried by a wire bail 333 may be mounted between the rolls by inserting its ends as trunnions in bearing holes or recesses formed in the pivotal mounting for the arms.

The wheel 331 comprises a cylindrical form having a groove therein in which is mounted a rubber O-ring 334 which engages the two rolls of paper, as indicated for example in FIG. 31, and provides a positive drive between the spools. During operation without the drive wheel 331 the two spools of tape are arranged to feed and collect the tape for printing, the driving force being applied by the rubber platen indicated diagrammatically at 336 about which the paper passes when moving from the supply roll to the take-up roll. When the bail and driving wheel 331 are not being employed, the bail may be allowed to rest on the external surface of the paper as it is collected on the take-up roll in the position shown in FIGS. 27, 29 and 30.

This device provides a very simple and effective arrangement for handling the large quantities of printing tape frequently required in extensive accounting operations and avoids the necessity of employing baskets or boxes into which the tape is allowed to fall and collect as the machine is operated.

Summarizing the operation of the machine, the carriage is initially positioned for entry in the left tabulator column and the account number is entered by the operator. During this part of the operation, the checking device 60 functions to insure proper account identification. Thus, as a key 66 is depressed for the first digit, the so-called all bail 137 which is disposed across the array of key hammers 65 (FIGS. 6 and 7), is pivoted to engage and close the switch 136 actuating solenoid 52. The linkage 72, 73 from the solenoid 52 swings the drum 62 toward the key hammers 65 and the friction wheel 71 on the drum shaft is driven by the inner surface of cylinder 70 until the appropriate stop lug on the drum for the digit entered (unweighted) engages the extended hammer 65. This partial revolution is transmitted by engagement of gears 76 and 77 to rotate the control cam 80 for the motor bar 58. At the same time, gear 77 drives gear 77a on shaft 78 to rotate rotary switch 79 which, moving across contacts 79a and 79b, lights the indicator lamp 47 showing the number of one-tenth revolutions completed, which, in the case of an unweighted digit, is advanced the number of one-tenth revolutions equal to the digit itself. Then the appropriate key for the second digit is depressed and solenoid 52 is again energized. However, by this time the carriage has indexed to the left and the alternate high-low cam 87 (FIG. 11) has presented a high portion to the cam follower which, therefore, closes the switch 59 to energize the solenoid 53. Energization of the solenoid 53 shifts the drum 62 axially to bring the stop lugs corresponding to the weighted code numbers opposite their related key hammers 65. Thus, when the key for the second digit and each alternate digit therefor are depressed the drum will rotate through a number of one-tenth revolutions corresponding to the weighted code number and because rotary contact 79 moves through a corresponding arc, the indication light 47 represents the position of the shaft 78 resulting from the total rotational movement thereof, constituting an algebraic addition of the alternately weighted and unweighted increments of rotation.

When an account number is entered for a new customer for the first time the number indicated by the panel lights 47 represents the number of one-tenth revolutions beyond a full revolution of the control cam 80, i.e. the amount by which the total of weighted and unweighted numbers exceeds an even multiple of ten. Then the operator adds as a final digit the number necessary to bring the total of weighted and unweighted digits to a multiple of ten. This number will insure disposition of the control cam 80 so as to permit operation of the motor bar 58 for the subsequent adding operations. The code number plus the self-check number is entered on the customer's master card so that it is automatically applied thereafter.

With the checking device 60 being driven through alternately unweighted and weighted code increments an error will throw the total off and compensating errors such as by transposition of two digits, are extremely unlikely. For example, transposition of the digits 4 and 5 will produce a 1 and 4 (total 5) instead of an 8 and 5 (total 13).

The account number having been checked the motor bar 58 is now free to operate and the number is entered and the machine conditioned for the adding operations to follow. In the case of error in placing the account number, the clearing bar 88 is moved to the right (FIGS. 8 and 9) to engage catch member 164 which closes switch 166 energizing solenoid 52. This drives the checking mechanism 60 and with it a drum 163. A stop lug 168 on the drum 163 is engaged by the catch member 164 when the zero position is reached.

When the account number is entered, the solenoid 117 is actuated so that clutching device 102 releases the gear 103 which rotates through one revolution producing a one-half revolution of the shaft 100 moving the link 98 (FIG. 4) to its lowermost position pulling the cable 96 to draw the carriage to its right-hand position. Since the non-add cam 183 (FIGS. 16 to 19) is activated, the simultaneous operation of the solenoid 117 and the cardioid cam 182 cause the notch 114 to engage the pin 115 so that the line space yoke 106 can't move to operate the line space bail.

Now the checking device 60 is inactivated and the money items tabulated in the right-hand column. As each item is entered, the line feed yoke 106 is actuated to engage and operate the carriage ratchet bail. When the column is fully tabulated the now free motor bar 58 is depressed and the total recorded.

While a preferred embodiment of the system of this invention has been illustrated in connection with specific types of key punch and computing machine and specific arrangements and constructions of the component parts, various alternations and modifications will occur to those skilled in the art. Therefore, it is not desired that the invention be limited to the specific details illustrated and described and it is intended by the appended claims to cover all modifications which fall within the spirit and scope of the invention.

I claim:

1. In combination with computing and recording apparatus having a plurality of digit keys, a memory device for holding representations of digits selected by the depressing of said keys, means for transmitting the digit information from said memory device to the recording equipment, and means for actuating said transmitting means, checking means for proving self-check code numbers operable in response to the depression of said keys and in proportion to digit values represented by depressed keys, said checking means being conditioned to render said actuating means ineffective upon occurrence of all such totals of digit values represented except multiples of one predetermined total, whereby said transmitting means may be actuated to effect recording only of valid code numbers.

2. In combination with computing and recording apparatus having a plurality of digit keys, a memory device for holding representations of digits selected by said keys, and means for transmitting the digit information from said memory device to the recording equipment, checking means for preventing the actuation of said transmitting means by improper combinations of digits in said memory device, said checking means comprising a member movable in steps, means cooperating between said member and said transmitting means for preventing the actuation of said transmitting means except in a predetermined position of said member, and means for moving said member upon actuation of each of said keys to advance the member by a predetermined number of steps representing a digit value selected by depression of each of said keys whereby the total movement of said member represents a summation of digital information entered by the selected keys, said member being operative to prevent operation of said transmitting means unless the total movement of said member has placed it in said predetermined position.

3. The combination with computing and recording apparatus as set forth in claim 2 wherein said means for moving said member upon actuation of said keys includes a coding element for determining the number of steps of movement to be effected upon actuation of each key depending upon the order of actuation of the key with respect to the other actuated keys.

4. The combination with computing and recording apparatus as set forth in claim 2 wherein said means for moving said member upon actuation of said keys includes a coding element shiftable to any one of a plurality of different operating positions and including means in each position for effecting a different digit value representing a number of steps of movement of said member upon actuation of each key whereby each key may upon actuation effect any one of a plurality of different stepped movements of said member depending upon the position of said coding element.

5. The combination with computing and recording apparatus as set forth in claim 2 including a row of elements each actuated by a respective one of said keys, and wherein said means for moving said member upon actuation of said keys includes a cylinder mounted for rotation on an axis parallel to said row of elements and having pairs of axially spaced stops thereon, a catch on each of said elements for alternative engagement with the stop of a respective one of said pairs, means for moving said cylinder axially to select which stop of each pair is to be positioned for engagement with said catches, means including a stop for retaining said cylinder normally in its zero position, means for rotating said cylinder upon actuation of any digit key other than zero and for driving said member a number of steps corresponding to such key and for stopping said member by engagement of one stop of the respective pair, said cylinder in one axial position moving said member the same number of steps as the digit selected and in its other position moving said member a coded number of steps dependent upon the digit selected.

6. In a ten-key adding machine or the like having an information storage device and means connecting the keys of the machine for storing information therein, the combination therewith of a checking device for proving the validity of self-check account members set up on said storage device, said checking device comprising a rotatable member, a device for retaining a summation of digital information contained on said storage device, means including stops actuated by said keys for connecting said rotatable member to transfer information from said keys to said summation retaining device, a recording mechanism, and means for transmitting digital information from said storage device to said recording mechanism solely during the existence of a predetermined summation condition of said retaining device.

7. A self-checking computer having a plurality of digit keys and including a digit summation device for accumulating digit information upon the operation of the digit keys, said device comprising a rotatable cylinder having lugs arranged axially thereon and each representing digit values, means for placing said cylinder in either of two positions of its axis, means positioned adjacent said cylinder for locating stops actuated by the keys in the path of respective ones of said lugs, said cylinder in its first position being mounted for rotation from a zero position to an engaging relationship between one of said lugs and one of said key actuated stops, means for returning said cylinder to the other of its positions upon movement away from said stops, means for rotating said cylinder to its zero position in said second position of its axis, and means utilizing the rotation of said cylinder into engagement with any one of said stops for effecting a digit summation condition dependent upon the values of successively depressed digit keys.

8. In a computing and recording apparatus including a computer having a plurality of entry keys, a recording device, and transmitting means for supplying digit information from said computer to said recording device, the combination therewith of a self-check control device operated in accordance with the summation of digit information selected by operation of said entry keys, said control device being operative to assume a control condition only in response to a predetermined digital summation representative of a self-checking code, and including blocking means effective when an improper code number is entered on said control device for preventing operation of said transmitting means.

9. In a computing and recording system for accounting operations including the use of self-checking code numbers, a self-checking computer, means controlled by said computer for preventing the normal functioning of the system in the event an improper code number is entered in the computer, said self-checking computer including a digit summation device and a plurality of digit representing pilot lights controlled thereby, said pilot lights in the event of the entry of a code number which is invalid because it lacks one digit indicating the correct digit to be inserted to render the code number valid.

10. In a computing and recording system having a self-checking computer as set forth in claim 9, means connected with said summation device for affording the checking of any digit in a code number during entry in the computer, said last-mentioned means including a control device dependent upon the position of the selected digit in the code number for selecting the control condition of said pilot lights.

11. In combination with computing and recording apparatus having a manual key panel, manually operable means for actuating the recording equipment, means for checking the correctness of a multi-digit number in accordance with a predetermined code, said means comprising a member movable in steps, coupling means between the keys of said panel and said member for advancing said member a predetermined number of steps depending upon the key which is depressed and for holding said member in its advanced position, and means effective in only a predetermined position of said member for affording operation of said means for actuating the recording mechanism of said equipment.

12. In combination with computing and recording apparatus having a manual key panel, manually operable means for actuating the recording equipment, and means for checking the correctness of a multi-digit number in accordance with a predetermined code, said means comprising a member movable in steps, coupling means between the keys of said panel and said member for advancing said member a predetermined number of steps depending upon the key on said panel which is depressed and for holding said member in its advanced position, means effective in only a predetermined position of said member for affording operation of said means for actuating the recording mechanism of said equipment, a coding element connected to said coupling means and controlling the number of steps said member is advanced by the depression of each key in accordance with the predetermined code, said element being actuated by each operation of the keys of said panel, and means dependent upon the entry of one less than the total number of digits in the code number for indicating the value of a digit necessary to complete said number whereby a code number having an unreadable digit may be reconstructed, said last-mentioned means including a digit indicating device and means dependent upon the position of said movable member and of said coding element for actuating said device to indicate the digit key required to be depressed to move said member to said predetermined position.

13. A computing and recording equipment as set forth in claim 12 wherein said indicating device comprises a plurality of lights corresponding respectively to said keys, a plurality of switch assemblies each having a set of contacts corresponding respectively to said keys and connected with said movable member to energize the one of said lights corresponding to the position of said movable member, one of said switches connecting said lights to indicate a single digit to complete the predetermined code and another to indicate a weighted digit to complete the code, and wherein said code element is connected to select for actuation the one of said switches corresponding to the position of said coding element whereby the digit omitted from the number and necessary to complete the code is indicated by the selected one of said lights.

14. An account number checking device for computing and recording equipment having a bank of keys, a memory device for retaining the digit value of each punched key and transmission means for transferring digit values from the memory device to the recording equipment, comprising a plurality of movable catches arranged in a line, each catch connected to a different one of said keys and moved out of said line when the connecting key is depressed, a cylinder having axially spaced stops on its periphery, means shifting said cylinder from a first axial position to a second axial position upon depressing a key and thereafter returning said cylinder to said first axial position, in said second position each said stop being engageable with a different one of said catches in their non-alignment position at some rotational position of said cylinder, means rotating said cylinder from a zero position when shifted to said second axial position until one of said stop engages the catch actuated by the depressed key, the peripheral position of each stop being such as to allow said cylinder to rotate a fractional part of a revolution which is proportionate to the digital value of the depressed key before engaging the actuated catch, means rotating said cylinder to the zero position upon returning to said first axial position, a control member coupled to said cylinder only while in said second axial position and being rotated an amount proportional to that of said cylinder while in said second position, whereby the position of said control member represents the sum of the fractional revolutions imparted to said cylinder by each depressed key, and interfering means controlled by the position of said control member and cooperating with said transmission means to prevent said transmission means transferring the digital information to the recording equipment except in one position of said control member, thereby checking an account number by the method of requiring the digits of a valid account number to equal a multiple of a predetermined total.

15. The checking device described in claim 14 additionally comprising a means moving said cylinder axially to a plurality of locations, a set of stops axially located on the periphery of said cylinder for each said different cylinder location, each set of stops comprising one stop engageable with each of said catches when in an actuated position, the stops comprising each said set being peripherally located such that the fractional revolution of said cylinder before engaging an actuated catch on depressing a key is proportional to a weighted value of the digit representing the depressed key, a different weighted value being assigned the digits for each said cylinder location, and a sequencing means actuating said cylinder moving means to place said cylinder in one of said axial locations each time a key is depressed in a predetermined sequence, whereby the digits of an account number may be assigned weighted values in a predetermined sequence for checking purposes.

16. The account number checking device described in claim 14 additionally comprising a switch having a rotary element which consecutively contacts a different one of circularly spaced contact points equal in number to said keys, means coupling said rotary element to said control member so that the contact position of said rotary element corresponds to the rotational position of said control member, an indicator representing a different key connected to each said contact point by a complementary wiring arrangement wherein each contact point connects to an indicator representing the digit which must be keyed to complete the rotation of said control member to the non-interfering position, and means energizing said indicator by said switch after keying one less than the number of digits in an account number, thereby indicating the missing digit to complete a valid account number.

17. The account number checking device described in claim 15 additionally comprising a separate rotary switch corresponding to each one of said sets of stops, each said switch having a rotary element which consecutively contacts a different one of circularly spaced contact points equal in number to said keys, means coupling the rotary element of each said switch to said control member so that the contact position of each said rotary element corresponds to the rotational position of said control member an indicator bank separately connected to the contacts of each said switch, each indicator of said bank representing a different key and connecting to a different contact point of each said switch by a complementary wiring arrangement wherein each contact point connects to an indicator representing the digit which must be keyed to complete the revolution of said control member to the non-interfering position when the set of cylinder stops corresponding to said switch is controlling the rotation of said control member, and means energizing the rotary switch corresponding to the set of stops which controls the rotation of said control members at the sequential point of the missing digit when keying the account number, whereby the indicator representing the missing number required to complete a valid account number is actuated upon keying all but the missing number.

References Cited in the file of this patent

UNITED STATES PATENTS

| | | |
|---|---|---|
| 1,131,849 | Magnus | Mar. 16, 1915 |
| 1,825,783 | Dunning et al. | Oct. 6, 1931 |
| 1,965,884 | Crossman | July 10, 1934 |
| 2,526,734 | Davidson et al. | Oct. 24, 1950 |
| 2,644,636 | Christian et al. | July 7, 1953 |
| 2,695,134 | Sundstrand | Nov. 23, 1954 |
| 2,784,389 | Kelly | Mar. 5, 1957 |
| 2,795,375 | Esdale | June 11, 1957 |
| 2,827,623 | Ainsworth | Mar. 18, 1958 |
| 2,866,176 | Durfee et al. | Dec. 23, 1958 |
| 2,888,199 | Reumerman | May 26, 1959 |